US011872809B2

(12) United States Patent
Hashimoto

(10) Patent No.: US 11,872,809 B2
(45) Date of Patent: Jan. 16, 2024

(54) HEAD ADJUSTMENT DEVICE, HEAD DEVICE, AND PRINTING APPARATUS

(71) Applicant: FUJIFILM Corporation, Tokyo (JP)

(72) Inventor: Masahiko Hashimoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 17/475,317

(22) Filed: Sep. 14, 2021

(65) Prior Publication Data

US 2022/0001663 A1 Jan. 6, 2022

Related U.S. Application Data

(63) Continuation of application No. PCT/JP2020/013335, filed on Mar. 25, 2020.

(30) Foreign Application Priority Data

Mar. 28, 2019 (JP) ................................ 2019-063243

(51) Int. Cl.
*B41J 2/045* (2006.01)
*B41J 25/00* (2006.01)

(52) U.S. Cl.
CPC .......... *B41J 2/04505* (2013.01); *B41J 25/001* (2013.01)

(58) Field of Classification Search
CPC .. B41J 25/001; B41J 2/04505; B41J 2/04586; B41J 2/245; B41J 2/2117
See application file for complete search history.

(56) References Cited

U.S. PATENT DOCUMENTS

| | | | | |
|---|---|---|---|---|
| 10,532,592 | B2 * | 1/2020 | Izawa | B41J 2/2146 |
| 2010/0238247 | A1 | 9/2010 | Doo | |
| 2021/0039409 | A1 * | 2/2021 | Costal Fornells | B41J 2/2114 |

FOREIGN PATENT DOCUMENTS

| | | |
|---|---|---|
| EP | 1992494 | 11/2008 |
| JP | 2004136555 | 5/2004 |
| JP | 2008132795 | 6/2008 |
| JP | 2009285899 | 12/2009 |

(Continued)

OTHER PUBLICATIONS

"Office Action of Japan Counterpart Application" with English translation thereof, dated Aug. 17, 2022, p. 1-p. 10.

(Continued)

*Primary Examiner* — Thinh H Nguyen
(74) *Attorney, Agent, or Firm* — JCIPRNET

(57) ABSTRACT

To provide a head adjustment device, a head device, and a printing apparatus with which it is possible to perform automatic position adjustment of a head module in a head including one or more head modules. Provided is a head adjustment device (150) which adjusts a position of a head module in a head including one or more head modules, the head adjustment device (150) including an adjustment unit that includes an actuator that is connected to an adjustment member, which is operated in a case where the position of the head module is to be adjusted, and operates the adjustment member, a movement unit (248) that moves the adjustment unit relative to the head, and a movement control unit (244) that sets coordinates to be applied to the movement unit based on a reference position of the head module and moves the adjustment unit based on coordinate values of the adjustment member.

10 Claims, 18 Drawing Sheets

(56) References Cited

FOREIGN PATENT DOCUMENTS

| | | |
|---|---|---|
| JP | 2010179614 | 8/2010 |
| JP | 2010214769 | 9/2010 |
| JP | 2018114722 | 7/2018 |
| WO | 2019044031 | 3/2019 |

OTHER PUBLICATIONS

"Search Report of Europe Counterpart Application", dated Apr. 21, 2022, p. 1-p. 9.

"International Search Report (Form PCT/ISA/210) of PCT/JP2020/013335," dated Jun. 9, 2020, with English translation thereof, pp. 1-6.

"Written Opinion of the International Searching Authority (Form PCT/ISA/237)" of PCT/JP2020/013335, dated Jun. 9, 2020, with English translation thereof, pp. 1-15.

* cited by examiner

HEAD ADJUSTMENT DEVICE, HEAD DEVICE, AND PRINTING APPARATUS

CROSS-REFERENCE TO RELATED APPLICATIONS

The present application is a Continuation of PCT International Application No. PCT/JP2020/013335 filed on Mar. 25, 2020 claiming priority under 35 U.S.C § 119(a) to Japanese Patent Application No. 2019-063243 filed on Mar. 28, 2019. Each of the above applications is hereby expressly incorporated by reference, in its entirety, into the present application.

BACKGROUND OF THE INVENTION

1. Field of the Invention

The present invention relates to a head adjustment device, a head device, and a printing apparatus.

2. Description of the Related Art

In recent years, an ink jet printing apparatus has become widespread as an image printing apparatus. A structure in which a plurality of head modules are connected to each other as an ink jet head provided in an ink jet printing apparatus is known. Regarding an ink jet head obtained by connecting a plurality of head modules to each other, an image defect such as a streak and unevenness of a printed image may occur in a case where the head modules are not accurately connected to each other. Therefore, a structure for adjustment of the positions of the plurality of head modules is required.

Described in JP2008-132795A is a printing apparatus including a head adjustment driving unit that adjusts the rotation angle of a printing head and the position of the printing head in a sub scanning direction. In the apparatus described in JP2008-132795A, adjustment of the printing head is performed by adjusting the position of the printing head in a main scanning direction by means of a carriage, adjusting the position of a head adjustment unit in the sub scanning direction, and positionally aligning the printing head and the head adjustment unit.

Described in JP2018-114722A is an ink jet printing apparatus including a line-type ink jet head configured by connecting a plurality of head modules to each other along a longitudinal direction of an ink jet head. The ink jet head described in JP2018-114722A includes an adjustment mechanism for adjustment of the positions of the head modules in a main scanning direction and the positions of the head modules in a rotation direction. In JP2018-114722A, head module automatic adjustment mechanisms built in the head modules are disclosed.

SUMMARY OF THE INVENTION

Regarding the apparatus described in JP2008-132795A, a certain positioning accuracy is required for the printing head, the carriage, and the head adjustment unit in a case where automatic adjustment of the printing head is to be performed. However, in JP2008-132795A, there is no description about a configuration that realizes the positioning of the printing head, the carriage, and the head adjustment unit.

Regarding the head module automatic adjustment mechanism in JP2018-114722A, rotation mechanisms, motors, and the like that rotate cams are built into the head modules. As a result, there is a concern that the internal structures of the head modules become complicated. In addition, there is a concern that the sizes of the head modules become large. Furthermore, the same number of automatic adjustment mechanisms as the head modules are required and there is a concern about an increase in cost.

The present invention has been made in consideration of such circumstances and an object of the present invention is to provide a head adjustment device, a head device, and a printing apparatus with which it is possible to perform automatic position adjustment of a head module in a head including one or more head modules.

In order to achieve the above-described object, the following aspects of the invention are provided.

According to a first aspect, there is provided a head adjustment device which adjusts a position of a head module in a head including one or more head modules, the head adjustment device including an adjustment unit that includes an actuator that is connected to an adjustment member, which is operated in a case where the position of the head module is to be adjusted, and operates the adjustment member, a movement unit that moves the adjustment unit relative to the head, and a movement control unit that sets coordinates to be applied to the movement unit based on a reference position of the head and moves the adjustment unit based on coordinate values of the adjustment member.

According to the first aspect, the coordinates to be applied to the movement unit are set based on the reference position of the head and the movement unit is moved based on the coordinate values of the adjustment member of the head module so that the adjustment member and the actuator connected to the adjustment member are positionally aligned with each other. Accordingly, automatic position adjustment of the head module is possible.

The head may include only one head module and may include a plurality of the head modules. In a case where a plurality of the head modules are provided, arrangement in which the plurality of head modules are arranged in a row in one direction may be applied.

According to a second aspect, the head adjustment device related to the first aspect may further include a detection unit that detects the reference position of the head module.

According to the second aspect, the reference position of the head can be specified in the head adjustment device.

A configuration in which the detection unit includes a detection light irradiation unit that performs irradiation with detection light, a light receiving unit that receives reflected light of the detection light, and a signal processing unit that specifies the reference position of the head based on the reflected light of the detection light may also be adopted.

According to a third aspect, in the head adjustment device related to the second aspect, the movement unit may move the detection unit in one direction and the detection unit may detect a step of the head.

According to the third aspect, the detection unit detects a step which is a mechanically stable position on the head. Accordingly, the reference position of the head can be specified with high accuracy.

According to a fourth aspect, the head adjustment device related to any one of the first to third aspects may further include an elastic deformation member that is elastically deformed in a relative movement direction of the actuator and the adjustment member in a case where the actuator and the adjustment member are connected to each other.

According to the fourth aspect, the elastic deformation member acts in the case of contact between the actuator and the adjustment member and a load applied to the head module from the actuator can be reduced.

According to a fifth aspect, the head adjustment device related to any one of the first to fourth aspects may further include a connection detection unit that detects connection between the actuator and the adjustment member and an actuator control unit that operates the actuator in a case where the connection between the actuator and the adjustment member is detected by means of the connection detection unit.

According to the fifth aspect, the adjustment member can be operated in a state where the actuator and the adjustment member are connected to each other.

According to a sixth aspect, the head adjustment device related to the fifth aspect may further include a detection signal acquisition unit that acquires a detection signal of the position of the head module in the head and the actuator control unit may operate the actuator based on the detection signal acquired by means of the detection signal acquisition unit.

According to the sixth aspect, the position of the head module in the head can be specified. Accordingly, it is possible to positionally align the actuator and the adjustment member with each other with high accuracy.

As a configuration for detection of the position of the head module in the head, a configuration in which a sensor is provided on a support member that supports the head module can be adopted.

According to a seventh aspect, the head adjustment device related to any one of the first to sixth aspects may further include a head information acquisition unit that acquires head information including information about the position of the head module in the head and the movement control unit may derive coordinate values of the adjustment member based on a reference position of the head module.

According to the seventh aspect, the coordinate values of the adjustment member can be derived by using a positional relationship between the reference position of the head in the head and the position of the head module.

According to an eighth aspect, there is provided a head device including a head that includes one or more head modules and a head adjustment device that adjusts a position of the head module. The head adjustment device includes an adjustment unit that includes an actuator that is connected to an adjustment member, which is operated in a case where the position of the head module is to be adjusted, and operates the adjustment member, a movement unit that moves the adjustment unit relative to the head, and a movement control unit that sets coordinates to be applied to the movement unit based on a reference position of the head and moves the adjustment unit based on coordinate values of the adjustment member.

According to the eighth aspect, the same effect as the effect of the first aspect can be achieved.

In the eighth aspect, the same items as items specified in the second to seventh aspects can be appropriately combined. In that case, components for processing or functions specified in the head adjustment device can be grasped as components of the head device for processing and functions corresponding thereto.

According to a ninth aspect, in the head device related to the eighth sixth aspect, the adjustment member may include an eccentric cam provided in the head module, and the movement control unit may apply the position of the head module as the reference position of the head to set the coordinates to be applied to the movement unit based on the reference position of the head module and to move the adjustment unit based on the coordinate values of the adjustment member.

According to the ninth aspect, it is possible to perform high-accuracy positioning of the actuator and the adjustment member with high accuracy in a case where the adjustment member is moved in accordance with movement of the head module.

According to a tenth aspect, there is provided a printing apparatus including a head that includes one or more head modules and a head adjustment device that adjusts a position of the head module. The head adjustment device includes an adjustment unit that includes an actuator that is connected to an adjustment member, which is operated in a case where the position of the head module is to be adjusted, and operates the adjustment member, a movement unit that moves the adjustment unit relative to the head, and a movement control unit that sets coordinates to be applied to the movement unit based on a reference position of the head and moves the adjustment unit based on coordinate values of the adjustment member.

According to the tenth aspect, the same effect as the effect of the first aspect can be achieved.

In the tenth aspect, the same items as items specified in the second to seventh aspects can be appropriately combined. In that case, components for processing or functions specified in the head adjustment device can be grasped as components of the printing apparatus for processing and functions corresponding thereto.

According to the aspects of the present invention, coordinates to be applied to a movement unit are set based on a reference position of a head and a movement unit is moved based on coordinate values of an adjustment member of a head module so that the adjustment member and an actuator connected to the adjustment member are positionally aligned with each other. Accordingly, automatic position adjustment of the head module is possible.

DESCRIPTION OF THE PREFERRED EMBODIMENTS

Figure 1:
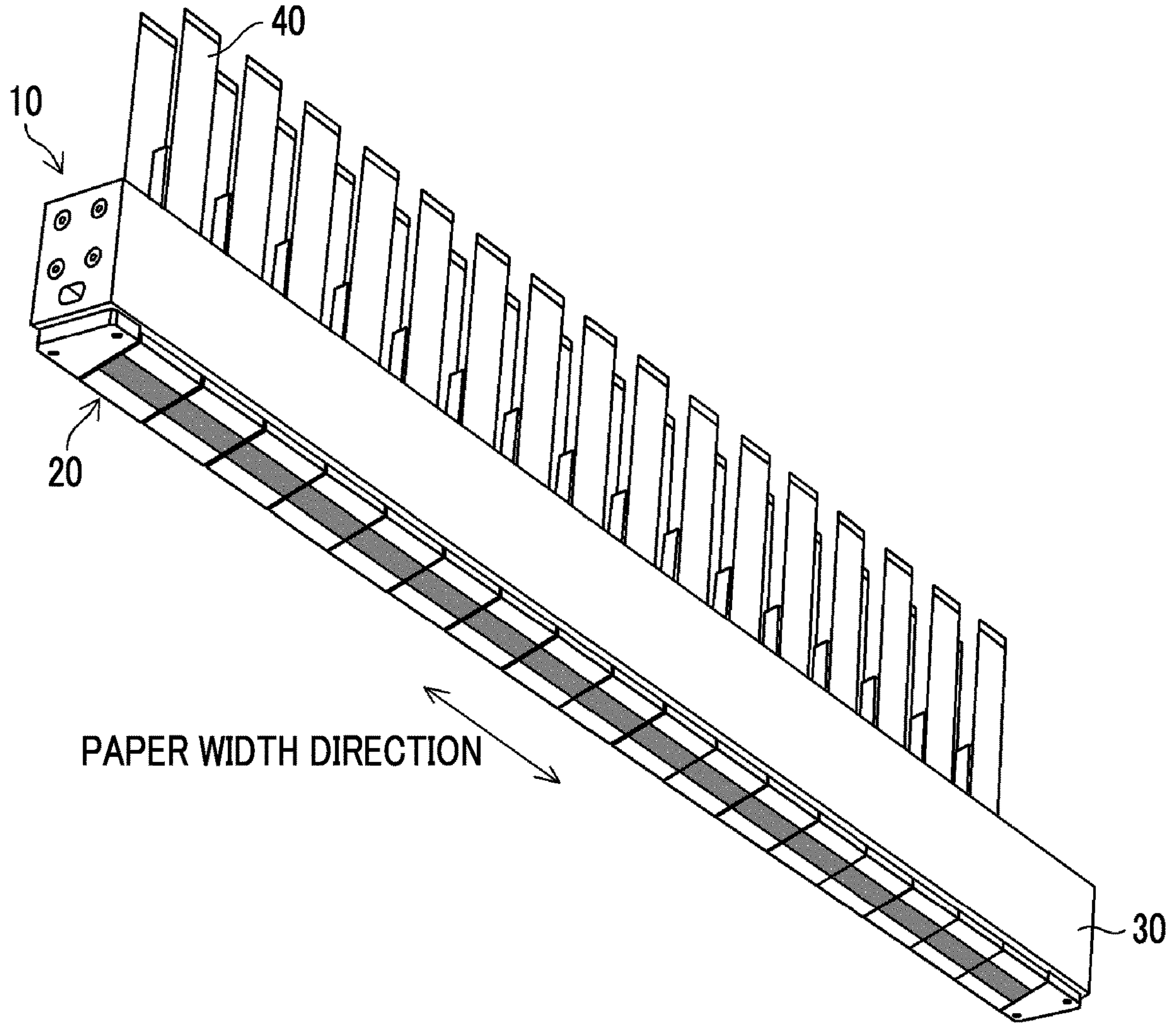
FIG. 1 is a perspective view showing the overall configuration of an ink jet head.

Hereinafter, preferable embodiments of the present invention will be described in detail with reference to the attached drawings. In the present specification, the same components will be given the same reference numerals and repetitive description thereof will be appropriately omitted.

Clarification of Problems

Problems solved by an adjustment method for an ink jet head in the present embodiment will be described with reference to FIGS. 1 to 3.

Structure of Ink Jet Head

FIG. 1 is a perspective view showing the overall configuration of an ink jet head. An ink jet head 10 shown in FIG. 1 has a structure in which a plurality of head modules 20 are connected to each other in a paper width direction and is fixed to a frame 30. A flexible substrate 40 including an electrical wiring line is connected to each head module 20. Here, the paper width direction is a direction orthogonal to a paper transportation direction and refers to a direction parallel to a paper surface of paper. In the following description, a reference numeral "X" may be used for the paper width direction. In addition, a reference numeral "Y" may be used for the paper transportation direction. A reference numeral "Z" may be used for a vertical direction.

Note that, "being parallel" in the present specification may also mean being substantially parallel, which results in the same effect as being parallel even if two directions are not strictly parallel. In addition, "being orthogonal" may also mean being substantially orthogonal, which results in the same effect as being orthogonal even if two directions are not strictly orthogonal to each other.

Figure 2:
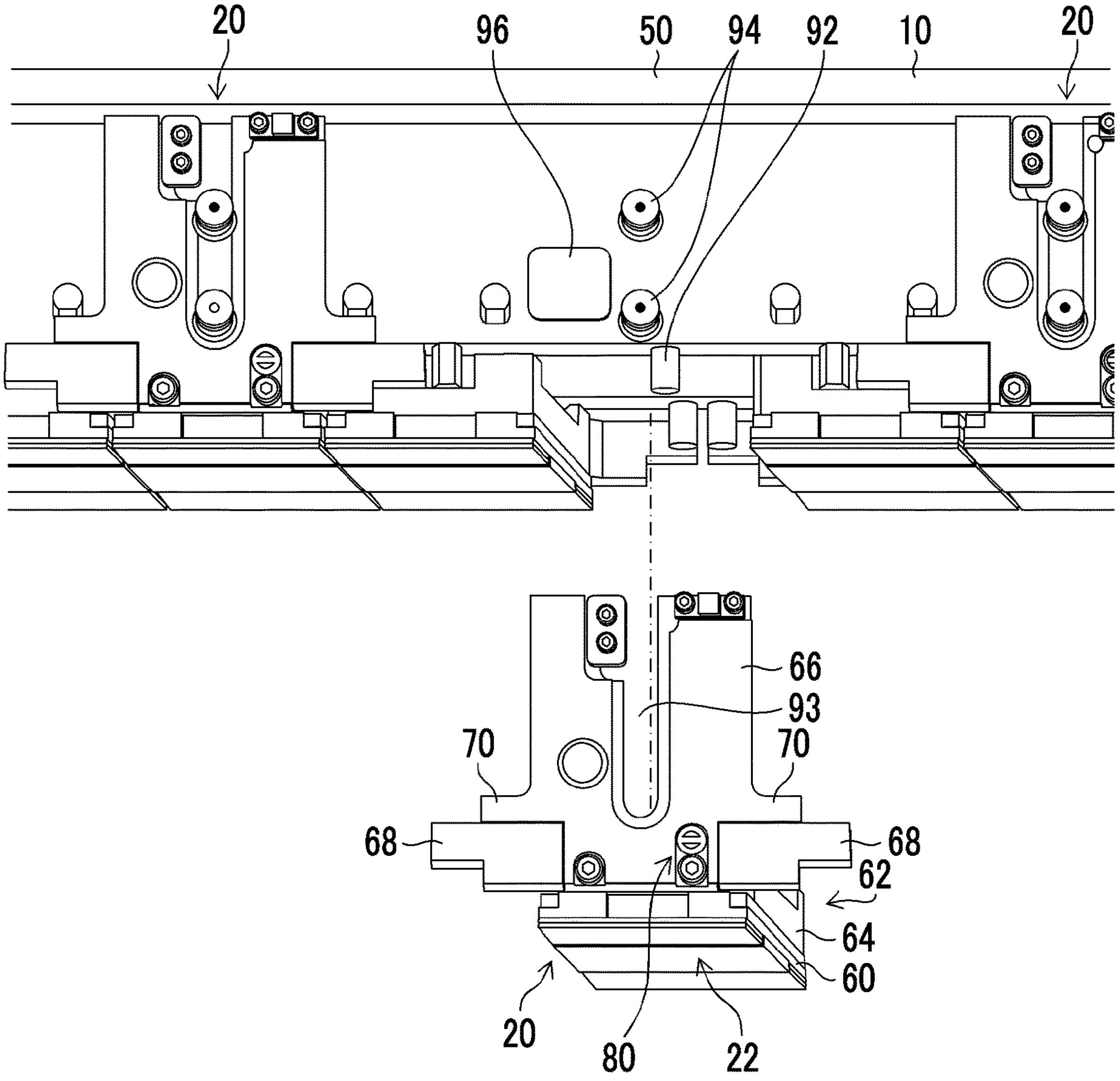
FIG. 2 is a perspective view showing a head module attachment structure.

FIG. 2 is a perspective view showing a head module attachment structure. Note that, FIG. 2 shows a portion of the ink jet head 10 shown in FIG. 1.

The head module 20 is fixed to a base frame 50. The head module 20 is a short ink jet head and can perform printing with respect to a prescribed printing width alone. The head module 20 includes a body part 60 for ink jetting and a bracket portion 62. The body part 60 includes a nozzle surface 22 including a plurality of nozzle openings. A matrix arrangement is applied to the plurality of nozzle openings. Note that, the nozzle openings are not shown.

The bracket portion 62 includes a horizontal portion 64 and a vertical portion 66. The horizontal portion 64 and the vertical portion 66 are perpendicularly bonded to each other and integrated with each other. The body part 60 is fixed to the horizontal portion 64. The vertical portion 66 is attached to the base frame 50.

The vertical portion 66 includes Y-reference members 68 that serve as positional references in a direction Y. The vertical portion 66 includes Z-reference members 70 that serve as positional references in a direction Z. The Y-reference members 68 and the Z-reference members 70 are provided on both sides of the vertical portion 66 in a direction X.

Figure 3:
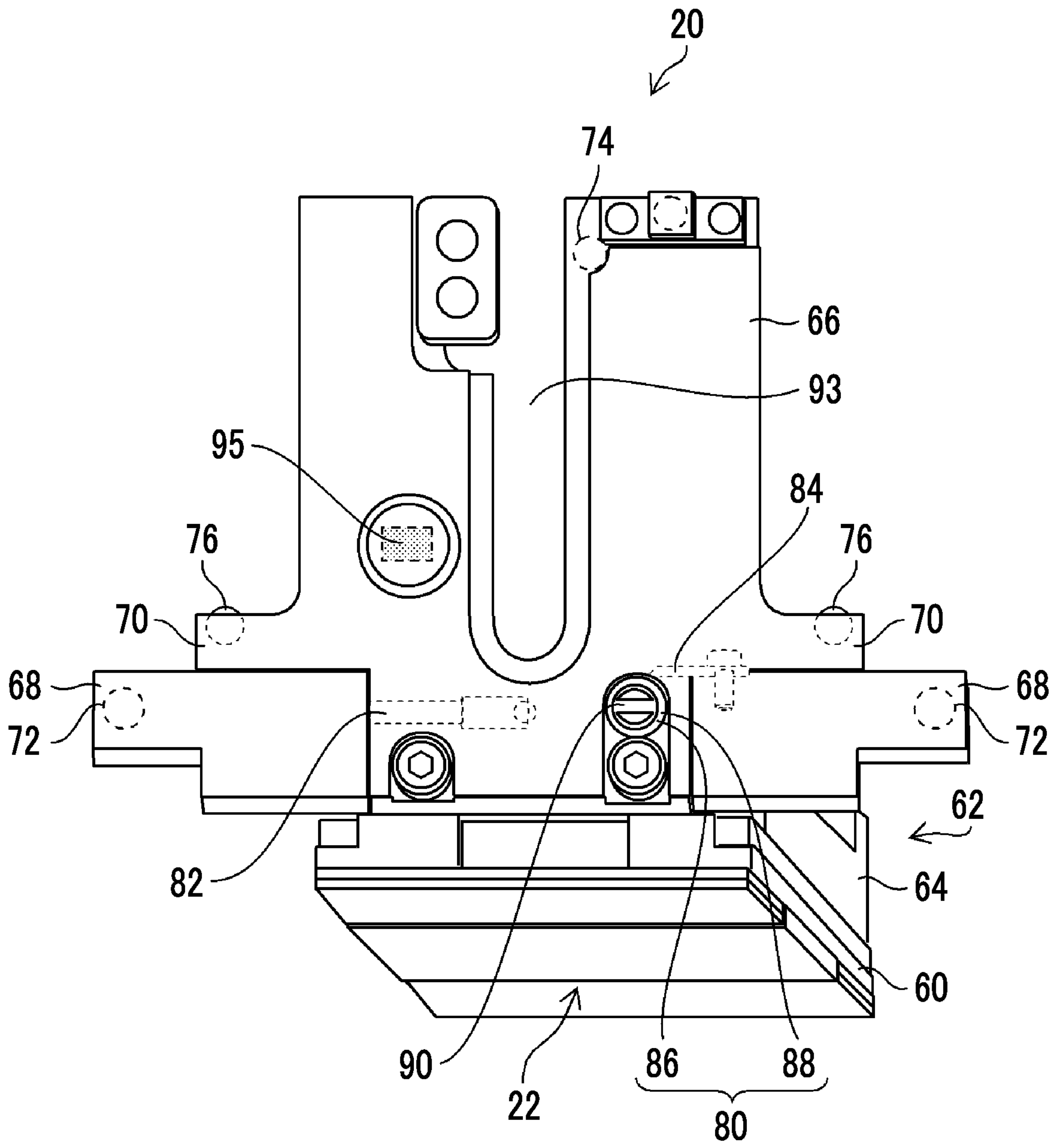
FIG. 3 is a perspective view of a head module.

FIG. 3 is a perspective view of the head module. As shown in FIG. 3, Y-fixed contact point members 72 are attached to the Y-reference members 68. In addition, a Y-movable contact point member 74 is attached to the vertical portion 66. As the Y-fixed contact point members 72 and the Y-movable contact point member 74, metal balls are applied. The Y-fixed contact point members 72 are fixed and supported in holes formed in the Y-reference members 68. The Y-movable contact point member 74 is inserted into a hole formed in the vertical portion 66 and is supported to be movable in the direction Y by means of a screw (not shown).

Z-fixed setting members 76 are attached to the Z-reference members 70. As the Z-fixed setting members 76, metal balls are applied. The Z-fixed setting members 76 are fixed and supported in holes formed in the Z-reference members 70.

The vertical portion 66 includes a cam mechanism 80, a plunger 82, and a leaf spring 84. The cam mechanism 80 includes a shaft portion 86 and a cam portion 88. The shaft portion 86 includes a groove portion 90. The shaft portion 86 is eccentrically connected to the cam portion 88. The leaf spring 84 presses a peripheral surface of the cam portion 88. Accordingly, certain resistance is applied in a case where the shaft portion 86 is rotated. The cam mechanism 80 described in the embodiment corresponds to an example of an eccentric cam.

The plunger 82 is disposed at a position at which a tip part faces the cam portion 88. The tip part of the plunger 82 and the cam portion 88 are disposed at a certain interval. In a case where the head module 20 is attached to the base frame 50 shown in FIG. 2, a positioning pin 92 provided at the base frame 50 is inserted into a space between the cam portion 88 and the plunger 82. Note that, the positioning pin 92 is shown in FIG. 2.

The plunger 82 presses the positioning pin 92 in the direction X. Accordingly, the head module 20 is biased in the direction X. In a case where the shaft portion 86 is rotated in such a state, the head module 20 moves in the direction X in accordance with the amount of rotation of the cam portion 88.

The vertical portion 66 shown in FIGS. 2 and 3 includes a guide groove 93. Guide posts 94 shown in FIG. 2 are fitted into the guide groove 93 in a case where the head module 20 is attached to the base frame 50. The guide groove 93 is provided with a positioning structure for the guide posts 94. The guide posts 94 include springs. The springs are not shown. In a case where the head module 20 is attached to the base frame 50, the guide posts 94 bias the head module 20 with respect to the base frame 50 in the direction Y.

A magnet 95 is attached to the vertical portion 66. The magnet 95 is disposed at a position at which the magnet 95 faces a magnetic sensor 96 provided at the base frame 50, which is shown in FIG. 2, in a case where the head module 20 is attached to the base frame 50. Based on a signal output from the magnetic sensor 96, the relative position of the head module 20 with respect to the base frame 50 can be grasped.

Problems About Position Adjustment of Head Module

Next, problems about position adjustment of the head module 20 shown in FIGS. 1 to 3 in the direction X will be described.

In a case where the position of the head module 20 in the direction X is to be adjusted, the distal end of a screw driver is inserted into the groove portion 90 of the shaft portion 86 and the screw driver is rotated to rotate the shaft portion 86. The head module 20 is moved in positive and negative directions in the direction X in accordance with the amount of rotation of the shaft portion 86.

Figure 4:
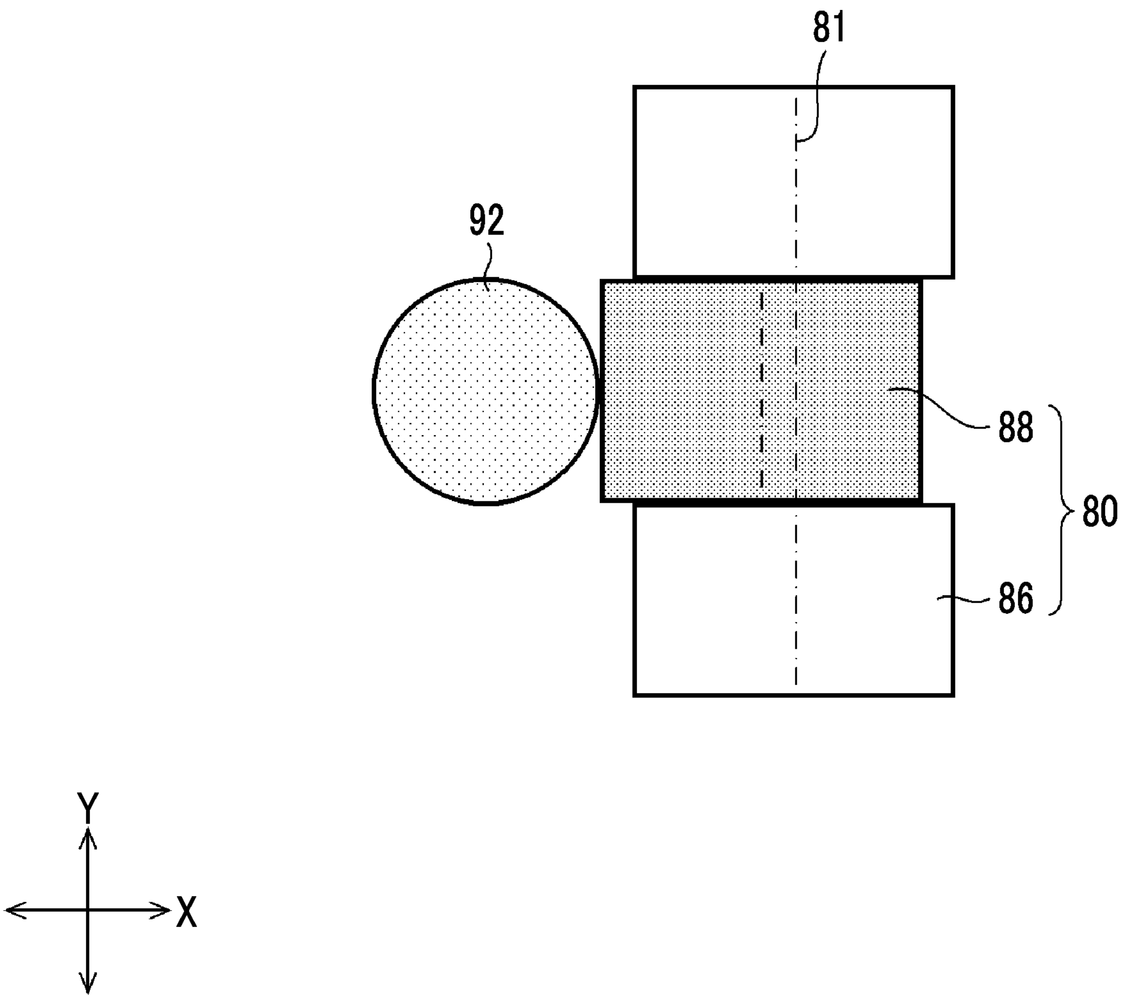
FIG. 4 is a top view of a cam mechanism.
Figure 5:
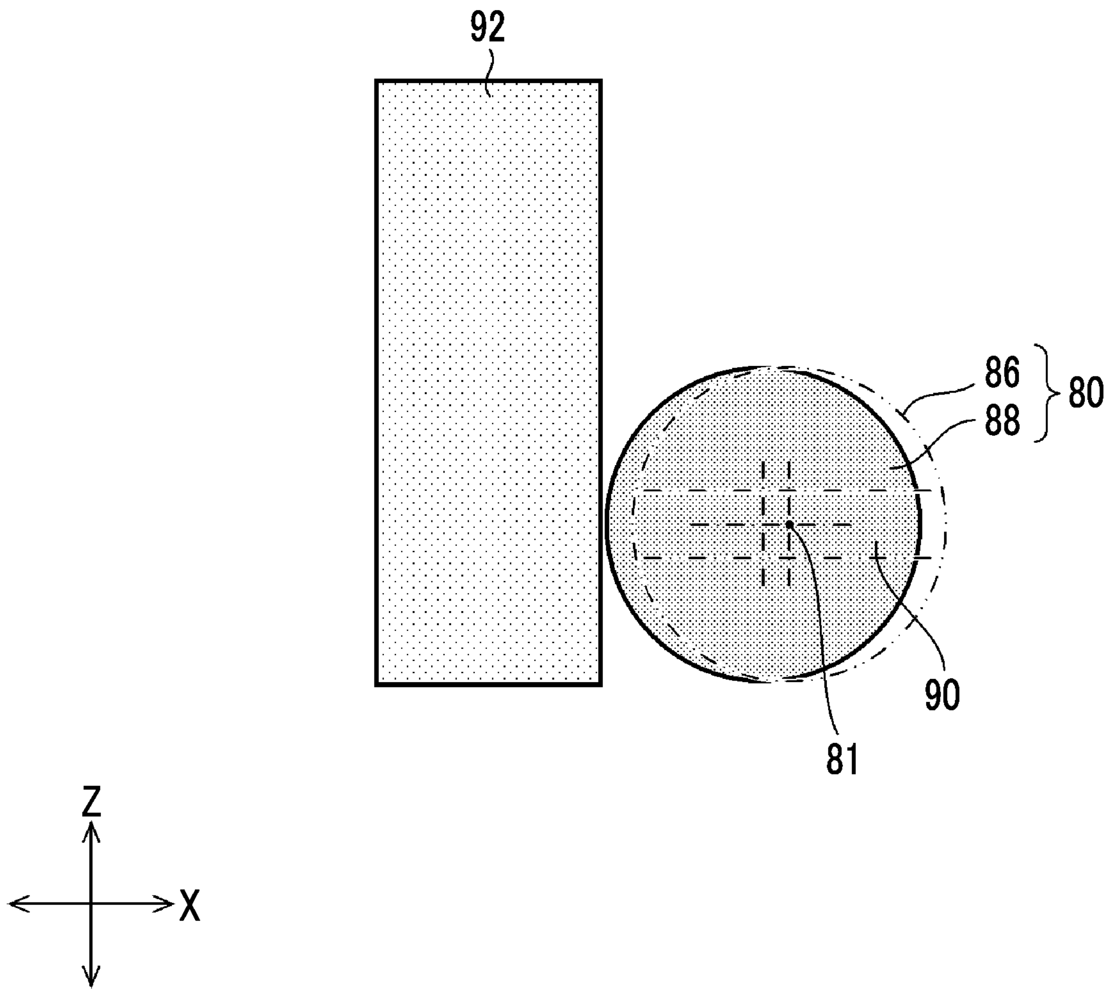
FIG. 5 is a front view of the cam mechanism.

FIG. 4 is a top view of the cam mechanism. FIG. 5 is a front view of the cam mechanism. A reference numeral 81 shown in FIGS. 4 and 5 represents a rotation axis of the shaft portion 86 and the cam portion 88. FIGS. 4 and 5 schematically show the relative position relationship between the cam portion 88 and the positioning pin 92. Since the cam mechanism 80 is provided in the head module 20, in a case where the head module 20 is moved in the direction X, the cam mechanism 80 is also moved in the direction X in the same manner as the head module 20.

Figure 6:
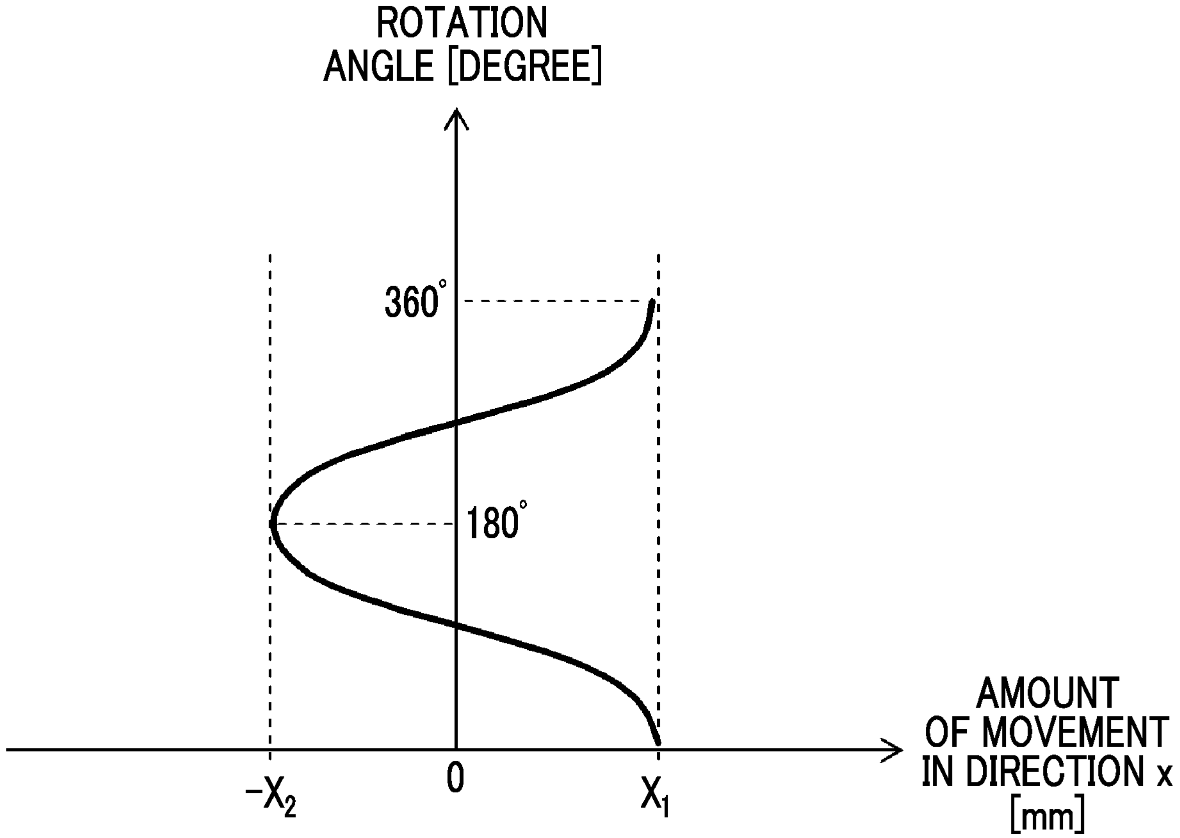
FIG. 6 is an explanatory diagram of a cam curve.

FIG. 6 is an explanatory diagram of a cam curve. FIG. 6 shows a relationship between the amount of movement of the head module 20 in the direction X and the rotation angle of the shaft portion 86 with a graph of which the horizontal axis corresponds to the amount of movement of the head module 20 in the direction X and the vertical axis corresponds to the rotation angle of the shaft portion 86.

As shown in FIG. 6, in a case where the shaft portion 86 is rotated once, the head module 20 may be moved from an initial position in the direction X to a position corresponding to positive $X_1$ millimeters in the positive direction in the direction X or moved from the initial position in the direction X to a position corresponding to negative $X_2$ millimeters in the negative direction in the direction X. Due to the movement of the head module 20, the groove portion 90 moves in the direction X by the same distance as a distance by which the head module 20 is moved. $X_1$ and $X_2$ are any values.

$X_1$ and $X_2$ may be the same value. As specific examples of $X_1$ and $X_2$, any values that exceed 0 micrometers and are equal to or less than 10 micrometers can be applied and the shaft portion 86 shown in the embodiment corresponds to an example of an adjustment member.

As a method of realizing automatic adjustment of the plurality of head modules 20 at low cost, it is conceivable to move one actuator to perform adjustment of each head module 20. Specifically, an actuator that rotates the shaft portion 86 of the cam mechanism 80 is disposed outside the ink jet head 10.

The head module 20 to be adjusted and the actuator are positionally aligned with each other, the actuator is coupled to the groove portion 90, and the cam portion 88 is rotated. Such adjustment is repeated the same number of times as the number of head modules 20.

Examples of a method of coupling the actuator and the cam mechanism 80 to each other include a method in which a gear is provided on a rotary portion of the cam mechanism 80 and the gear of the cam mechanism 80 and a gear of the actuator are fitted to each other. Such a method cannot solve a problem about cost reduction since there is an increase in the number of components and the mechanism becomes complicated. In addition, a load is generated in a radial direction and a thrust direction in a case where the gear is rotated and thus the head module needs to have such a rigidity that the head module can withstand the load. That is, such a method is not realistic.

Other examples of a method of coupling the actuator and the cam mechanism 80 to each other include a method in which a shape such as a cross hole, a slit, a hexagonal hole, and a hexarobuler hole is given to the shaft portion 86 and a screw driver that includes a tip part having a shape that can be fitted into the cross hole or the like is rotated by means of the actuator. In such a method, the rotation axis 81 of the shaft portion 86 and a rotation axis of the screw driver need to coincide with each other in a case where the shaft portion 86 is rotated.

However, in a case where the cam mechanism 80 is provided in the head module 20 which is movable in the direction X with respect to the base frame 50 which serves as a reference for position adjustment of the head module 20, the position of the head module 20 depends on how much the shaft portion 86 is rotated. Accordingly, the position of the rotation axis 81 of the shaft portion 86 becomes uncertain. Therefore, it is difficult to deal with such a problem with open-loop control, in which the rotation axis 81 of the shaft portion 86 of the cam mechanism 80 is at a prescribed position from the base frame 50 and the axis of the actuator is positioning-controlled with respect to the rotation axis 81 with the base frame 50 as a reference.

That is, in a case where open-loop control is applied to the positioning of the actuator, it is difficult to cause the rotation axis 81 of the shaft portion 86 to coincide with the rotation axis of the actuator. Therefore, it is difficult to perform automatic adjustment of the head module 20 by using the actuator provided outside the ink jet head 10.

As another method, a method is conceivable in which a sensor that detects the position of the head module 20 is provided, the amount of movement of the head module 20 with respect to the base frame 50 is corrected, and the positioning of the actuator is performed applying open-loop control.

However, since precise positioning is required in a case where the ink jet head 10 is to be mounted on an apparatus, there is a concern that the cost of the apparatus is increased.

To summarize, the inventors have found that automatic position adjustment of a head module in an ink jet head including a plurality of head modules has such problems. A head adjustment device or the like that can solve such problems will be described below.

Note that, the above-described problems are not peculiar to the ink jet head described with reference to FIGS. 1 to 6 and the ink jet head 10 including one or more head modules 20 has the same problems. In addition, the above-described problems are not limited to a liquid jetting head such as the ink jet head 10 and an electrophotographic recording head and the like have the same problems.

Configuration Example of Ink Jet Printing Apparatus

Overall Configuration of Ink Jet Printing Apparatus

Figure 7:
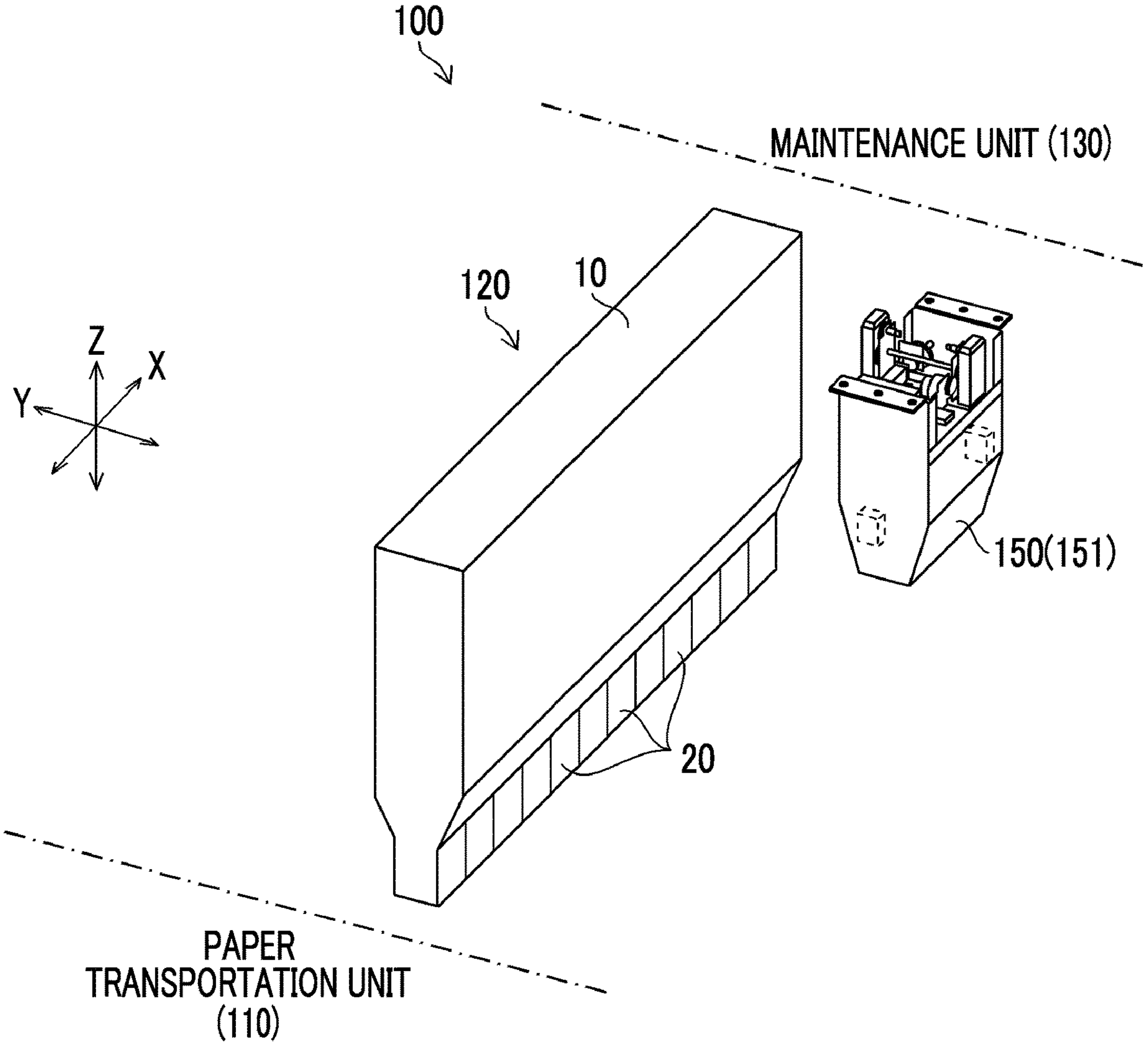
FIG. 7 is a schematic configuration view of an ink jet printing apparatus according to an embodiment.
Figure 8:
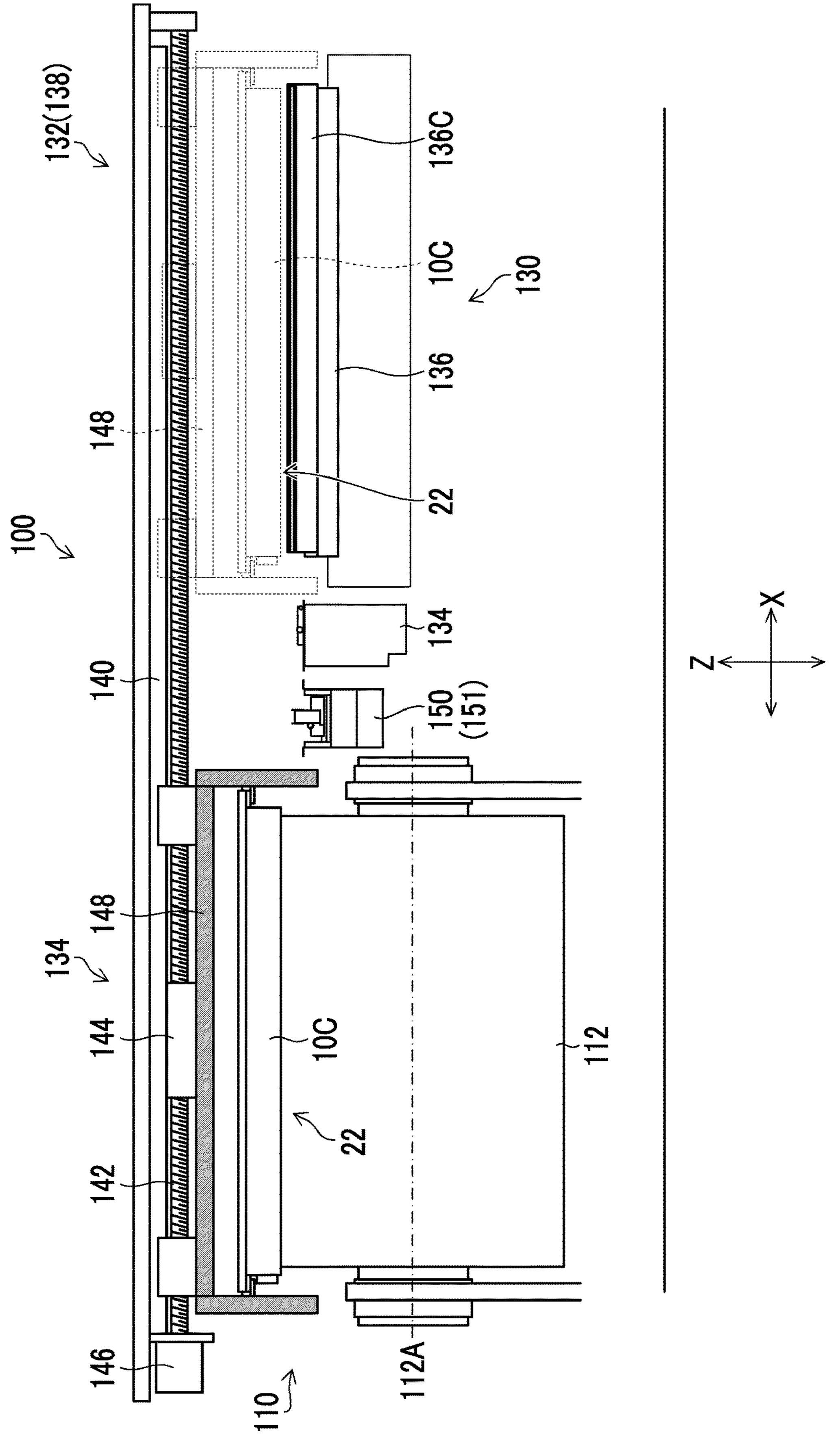
FIG. 8 is a front view of the ink jet printing apparatus shown in FIG. 7.
Figure 9:
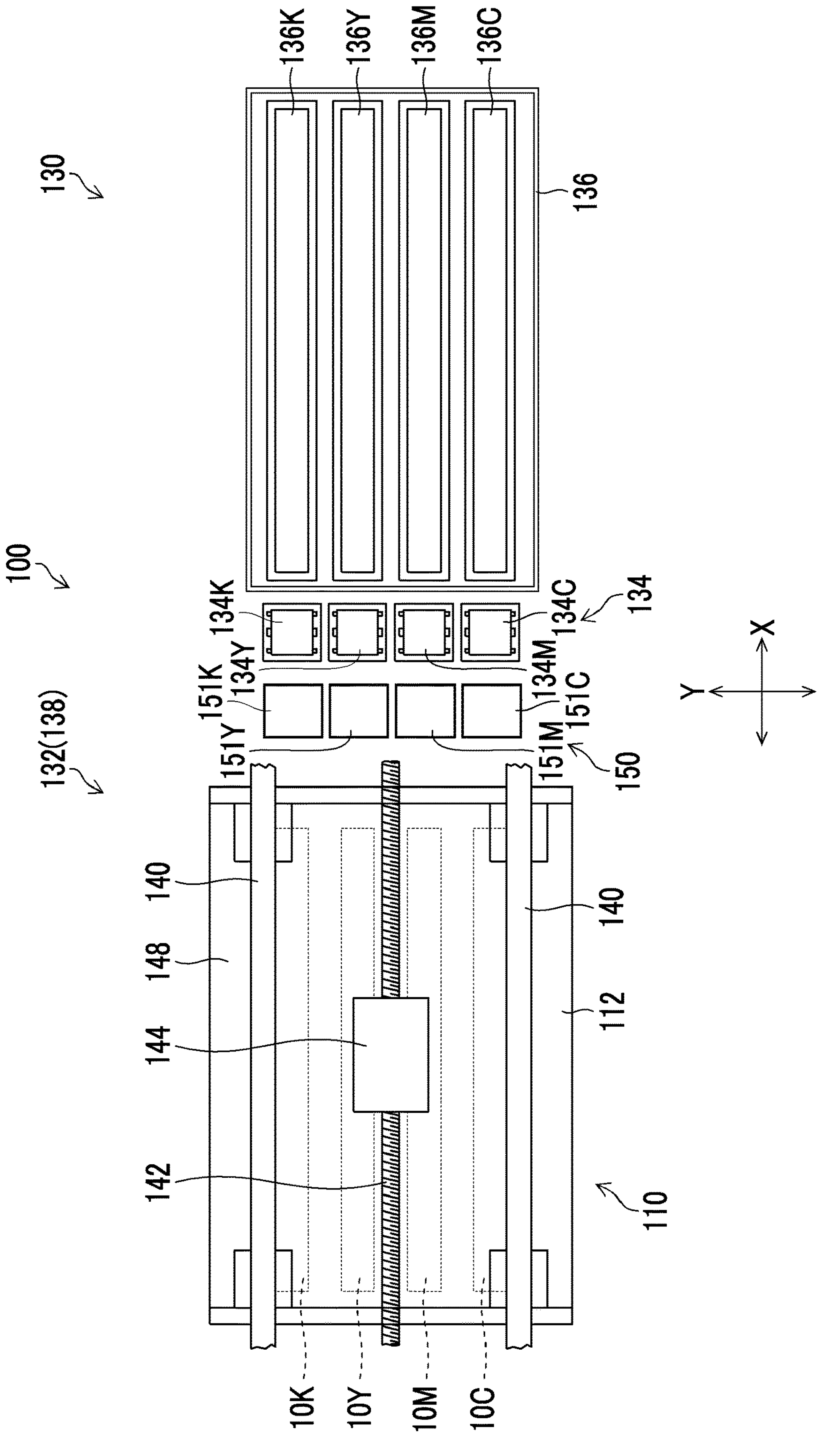
FIG. 9 is a top view of the ink jet printing apparatus shown in FIG. 7.

FIG. 7 is a schematic configuration view of an ink jet printing apparatus according to the embodiment. An ink jet printing apparatus 100 shown in the drawing includes a paper transportation unit 110, a printing unit 120, a maintenance unit 130, and a head adjustment unit 150. In FIG. 7, details of the paper transportation unit 110 and the maintenance unit 130 are not shown. An example of the configurations of the paper transportation unit 110 and the maintenance unit 130 is shown in FIGS. 8 and 9.

The printing unit 120 includes the ink jet head 10. Although only one ink jet head 10 is shown in FIG. 7, the printing unit 120 may include a plurality of the ink jet heads 10. Details of the ink jet head 10 and the head modules 20 shown in FIG. 7 are as shown in FIGS. 1 to 6. Here, the detailed description thereof will be omitted.

The head adjustment unit 150 includes a head adjusting unit 151. The head adjusting unit 151 performs adjustment of the head modules 20 provided in the ink jet head 10 in a movement path of the ink jet head 10 from the paper transportation unit 110 to the maintenance unit 130. The head adjustment unit 150 includes a moving mechanism. The head adjusting unit 151 is configured to be movable in each of the direction X, the direction Y, and the direction Z with respect to the ink jet head 10.

Regarding the head adjustment unit 150 shown in FIG. 7, one head adjusting unit 151 corresponding to one ink jet head 10 is shown. However, in a case where a plurality of the ink jet heads 10 are provided, the head adjustment unit 150 may include a plurality of the head adjusting units 151. Note that, one head adjusting unit 151 may be used for a plurality of the ink jet heads 10 with the head adjusting unit 151 moved in a direction in which the plurality of ink jet heads 10 are arranged.

FIG. 8 is a front view of the ink jet printing apparatus shown in FIG. 7. FIG. 9 is a top view of the ink jet printing apparatus shown in FIG. 7. The paper transportation unit 110 includes a printing drum 112. The printing drum 112 has a cylindrical shape and supports paper on an outer peripheral surface.

A paper supporting region on the outer peripheral surface of the printing drum 112, on which paper is supported, includes a plurality of adsorption holes. A prescribed size is applied to the adsorption holes. In addition, the plurality of adsorption holes are disposed with application of a prescribed arrangement pattern. The plurality of adsorption holes are connected to a pump via flow paths. Note that, the paper supported at the outer peripheral surface of the printing drum 112, the plurality of adsorption holes, the flow paths, and the pump are not shown.

A rotary shaft 112A of the printing drum 112 is connected to a rotary shaft of the motor via a connection member. In a case where the motor is rotated, the printing drum 112 rotates around the rotary shaft 112A. Accordingly, paper that is adsorbed and supported onto the outer peripheral surface of the printing drum 112 is transported along the paper transportation direction.

The printing unit 120 performs printing on paper supplied from a paper feeding unit (not shown). As shown in FIG. 9, the printing unit 120 includes an ink jet head 10C, an ink jet head 10M, an ink jet head 10Y, and an ink jet head 10K which correspond to cyan ink, magenta ink, yellow ink, and black ink, respectively. Any one of the ink jet head 10C, the ink jet head 10M, the ink jet head 10Y, or the ink jet head 10K corresponds to the ink jet head 10 shown in FIG. 7.

Hereinafter, in the description of a configuration common to the ink jet head 10C, the ink jet head 10M, the ink jet head 10Y, and the ink jet head 10K shown in FIG. 9, the ink jet head 10C, the ink jet head 10M, the ink jet head 10Y, and the ink jet head 10K will be referred to as the ink jet heads 10.

Ink is supplied from an ink tank to the ink jet head 10 via an ink supply path. The ink jet head includes an ink flow path, a pressure chamber, and a nozzle portion. In the ink jet head 10, the ink flow path communicates with the ink supply path via an ink supply port. The ink flow path communicates with the pressure chamber via a supply stop. The pressure chamber communicates with the nozzle portion. A nozzle opening is formed in the distal end of the nozzle portion.

A drop-on-demand method is applied to the ink jet head 10. The ink jet head 10 includes a piezoelectric element as a pressure generating element. The piezoelectric element is disposed on a wall of the pressure chamber. In a case where a drive voltage is supplied to the piezoelectric element, the pressure chamber is compressed in accordance with the drive voltage and ink liquid droplets are jetted from the nozzle opening. A thermal method may be applied as a jetting method used for the ink jet head. Note that, the ink tank, the ink supply path, the ink flow path, the pressure chamber, the nozzle portion, the supply stop, and the piezoelectric element are not shown.

A line-type structure is applied as the structure of the ink jet head 10. In the case of the line-type ink jet head 10, a plurality of nozzle openings are arranged in the paper width direction over a length corresponding to the total length of paper. A matrix arrangement may be applied to the arrangement of the plurality of nozzle openings.

The line-type ink jet head 10 can perform single-pass printing in which paper and the ink jet head 10 are relatively scanned by each other only once and printing is performed over the entire printing region of the paper. Note that, a serial method may be applied to the ink jet head 10.

The maintenance unit 130 includes a head moving mechanism 132, a wiping unit 134, and a cap unit 136. The head moving mechanism 132 collectively moves the ink jet head 10C, the ink jet head 10M, the ink jet head 10Y, and the ink jet head 10K.

The head moving mechanism 132 includes a raising and lowering mechanism. The raising and lowering mechanism collectively raises and lowers the ink jet head 10C, the ink jet head 10M, the ink jet head 10Y, and the ink jet head 10K along the vertical direction. The raising and lowering mechanism is not shown.

The head moving mechanism 132 includes a horizontal moving mechanism 138. The horizontal moving mechanism 138 includes a pair of guide rails 140, a ball screw 142, a nut 144, a motor 146, a head supporting frame 148, and the like.

The horizontal moving mechanism 138 causes the ink jet head 10C, the ink jet head 10M, the ink jet head 10Y, and the ink jet head 10K to collectively reciprocate along the direction X between a printing position corresponding to the position of the printing drum 112 and a cap position corresponding to the cap unit 136.

The horizontal moving mechanism 138 stops the ink jet head 10C, the ink jet head 10M, the ink jet head 10Y, and the ink jet head 10K at a head adjustment position corresponding to the position of the head adjustment unit 150, a wiping position corresponding to the position of the wiping unit 134, and a capping position corresponding to the position of the cap unit 136.

The head supporting frame 148 supports the ink jet head 10C, the ink jet head 10M, the ink jet head 10Y, and the ink jet head 10K. The head supporting frame 148 is connected to the nut 144. In a case where the motor 146 is operated to rotate the ball screw 142, the ink jet head 10C, the ink jet head 10M, the ink jet head 10Y, and the ink jet head 10K are moved along the direction X. Rotation and stoppage of the motor 146 can be controlled by using electric signals of a stepping motor, a servomotor, or the like and a motor can be applied as the motor 146.

The wiping unit 134 includes a wiping device 134C, a wiping device 134M, a wiping device 134Y, and a wiping device 134K. The wiping device 134C wipes the nozzle surface 22 of the ink jet head 10C. Similarly, the wiping device 134M, the wiping device 134Y, and the wiping device 134K wipe the nozzle surfaces 22 of the ink jet head 10M, the ink jet head 10Y, and the ink jet head 10K, respectively.

The wiping device 134C, the wiping device 134M, the wiping device 134Y, and the wiping device 134K cause wiping sheets to travel and bring the wiping sheets into contact with the nozzle surfaces 22 to wipe the nozzle surfaces 22.

The cap unit 136 includes a cap 136C, a cap 136M, a cap 136Y, and a cap 136K. The cap 136C caps the ink jet head 10C. The cap 136M, the cap 136Y, and the cap 136K cap the ink jet head 10M, the ink jet head 10Y, and the ink jet head 10K, respectively.

The head adjustment unit 150 includes four head adjusting units 151. The head adjusting unit 151C performs adjustment of the head module 20 provided in the ink jet head 10C. The head adjusting unit 151M, the head adjusting unit 151Y, and the head adjusting unit 151K perform adjustment of the head modules 20 provided the ink jet head 10M, the ink jet head 10Y, and the ink jet head 10K, respectively.

Configuration Example of Head Adjustment Unit

Figure 10:
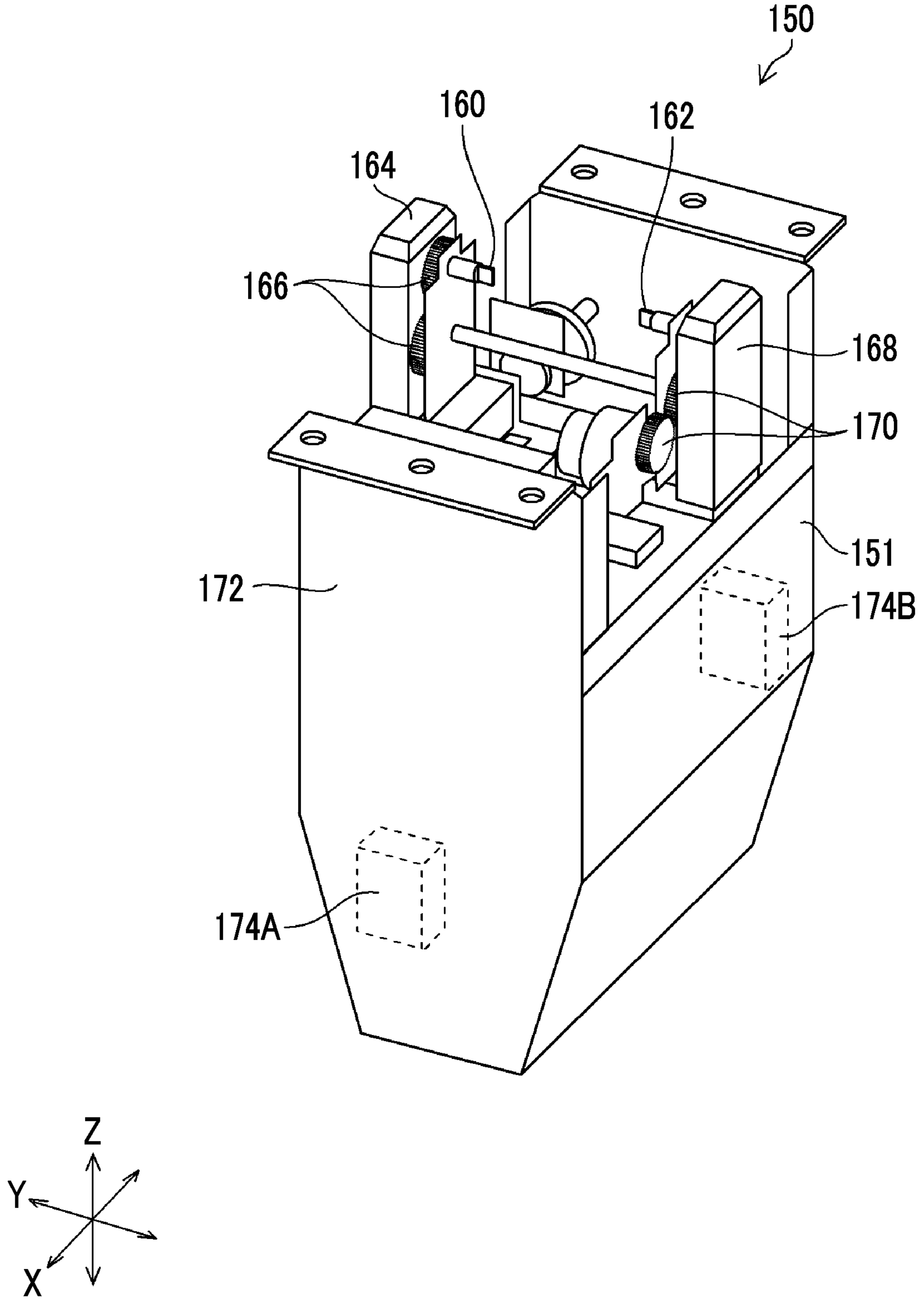
FIG. 10 is a perspective view showing a schematic configuration of a head adjustment unit shown in FIG. 7.

FIG. 10 is a perspective view showing a schematic configuration of the head adjustment unit shown in FIG. 7. The head adjustment unit 150 shown in the drawing includes the head adjusting unit 151. Regarding the head adjusting unit 151, any one of the head adjusting unit 151C, the head adjusting unit 151M, the head adjusting unit 151Y, or the head adjusting unit 151K shown in FIG. 9 is shown.

The head adjustment unit 150 includes an X-moving mechanism, a Y-moving mechanism, and a Z-moving mechanism. The X-moving mechanism moves the head adjusting unit 151 in the direction X. The Y-moving mechanism moves the head adjusting unit 151 in the direction Y. The Z-moving mechanism moves the head adjusting unit 151 in the direction Z.

Similar to the horizontal moving mechanism 138 shown in FIG. 8, the X-moving mechanism and the Y-moving mechanism include guide rails, ball screws, nuts, motors, supporting frames, and the like. As the Z-moving mechanism, a raising and lowering mechanism which uses a ball screw can be applied similarly to the X-moving mechanism and the like. Note that, the X-moving mechanism, the Y-moving mechanism, and the Z-moving mechanism are not shown.

The head adjusting unit 151 includes a first screw driver portion 160 and a second screw driver portion 162. The first screw driver portion 160 is fitted into the groove portion 90 of the cam mechanism 80 on one side, which is one of the cam mechanisms 80 arranged on both sides of the ink jet head 10 shown in FIG. 3 and the like in the direction Y. The second screw driver portion 162 is fitted into the groove portion 90 of the cam mechanism 80 on the other side, which is the other one of the cam mechanisms 80 arranged on both sides of the ink jet head 10 in the direction Y.

The first screw driver portion 160 is rotatably supported by a first driver supporting portion 164. A base end of the first screw driver portion 160 is connected to a rotary shaft of a first motor via a plurality of gears 166.

The second screw driver portion 162 is rotatably supported by a second driver supporting portion 168. A base end of the second screw driver portion 162 is connected to a rotary shaft of a second motor via a plurality of gears 170. Note that, in FIG. 10, the first motor and the second motor are not shown.

The head adjusting unit 151 includes a first laser sensor 174A and a second laser sensor 174B. The first laser sensor 174A and the second laser sensor 174B receive reflected light of a laser beam with which a prescribed position on the head module 20 is irradiated. Output signals of the first laser sensor 174A and the second laser sensor 174B are applied to position adjustment of the head module 20 which is performed by using the head adjusting unit 151.

The first screw driver portion 160, the second screw driver portion 162, and the like are stored in a case 172. The case 172 is supported to be movable in the direction X, the direction Y, and the direction Z by means of the X-moving mechanism, the Y-moving mechanism, and the Z-moving mechanism. Note that, the first screw driver portion 160 and the second screw driver portion 162 shown in the embodiment correspond to an example of an actuator.

Functional Block of Ink Jet Printing Apparatus

Figure 11:
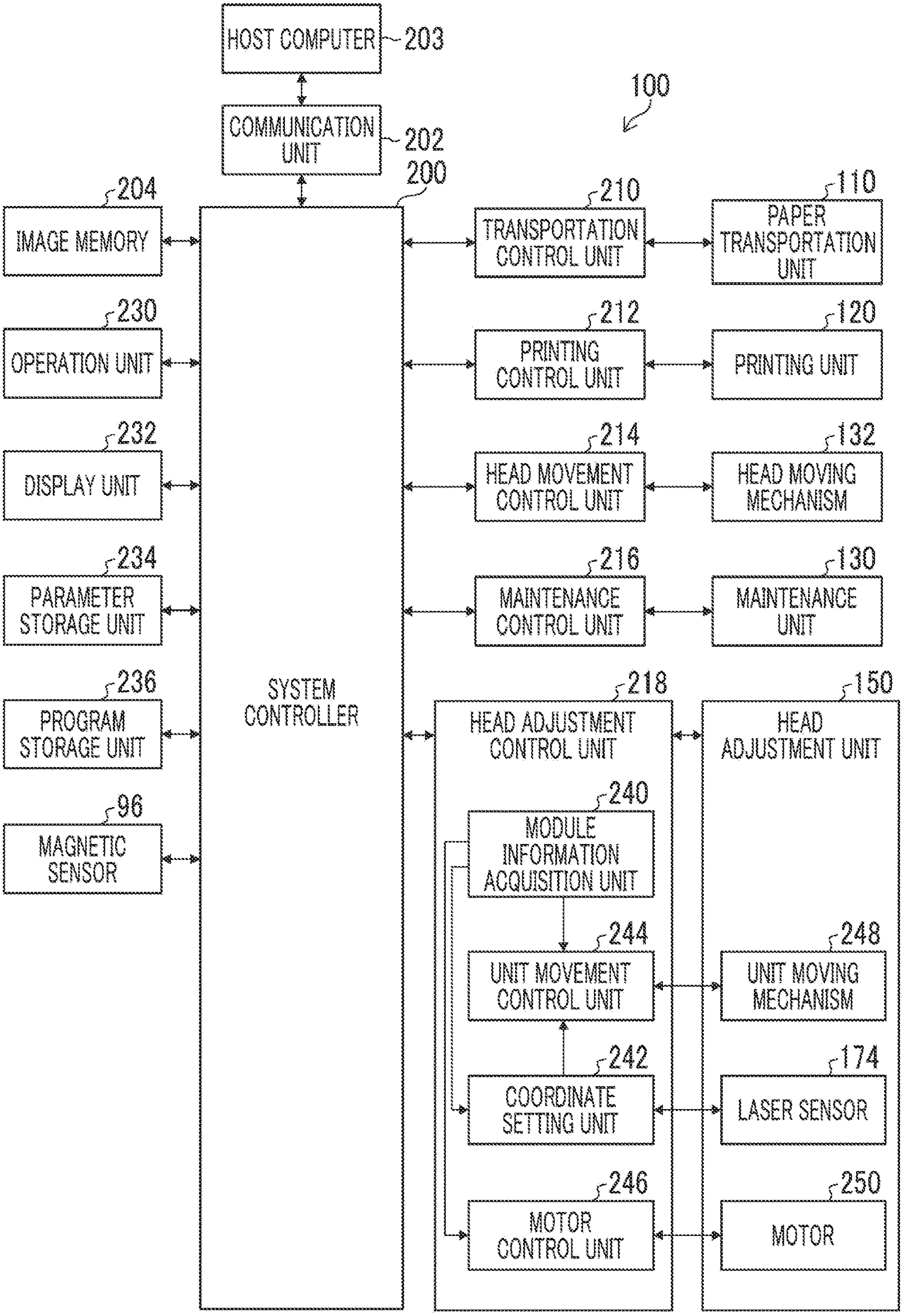
FIG. 11 is a functional block diagram of the ink jet printing apparatus shown in FIG. 7.

FIG. 11 is a functional block diagram of the ink jet printing apparatus shown in FIG. 7. The ink jet printing apparatus 100 includes a system controller 200. The system controller 200 functions as an overall control unit that collectively controls each part of the ink jet printing apparatus 100. In addition, the system controller 200 functions as a calculation unit that performs various calculation processes.

The system controller 200 may execute a program to control each part of the ink jet printing apparatus 100. Furthermore, the system controller 200 functions as a memory controller that controls the reading and writing of data in a memory such as a read only memory (ROM) and a random access memory (RAM).

The ink jet printing apparatus 100 includes a communication unit 202, an image memory 204, a transportation control unit 210, a printing control unit 212, a head movement control unit 214, a maintenance control unit 216, and a head adjustment control unit 218. The communication unit 202 includes a communication interface (not shown). The communication unit 202 can transmit and receive data to and from a host computer 203 connected to the communication interface.

The image memory 204 functions as a temporary storage unit for various data including image data. Data is read and written from and in the image memory 204 through the system controller 200. Image data loaded from the host computer 203 via the communication unit 202 is temporarily stored in the image memory 204.

The transportation control unit 210 controls the operation of the paper transportation unit 110 in the ink jet printing apparatus 100 in accordance with a command from the system controller 200.

The printing control unit 212 controls the operation of the printing unit 120 in accordance with a command from the system controller 200. That is, the printing control unit 212 controls ink jetting of the ink jet head 10C, the ink jet head 10M, the ink jet head 10Y, and the ink jet head 10K shown in FIG. 9.

The printing control unit 212 includes an image processing unit (not shown). The image processing unit forms dot data based on input image data. The image processing unit includes a color separation processing unit, a color conversion processing unit, a correction processing unit, and a halftone processing unit (not shown).

The color separation processing unit performs color separation processing on the input image data. For example, in a case where the input image data is represented by RGB, the color separation processing unit decomposes the input image data into data for each of RGB colors. Here, R represents red. G represents green. B represents blue.

The color conversion processing unit converts image data for each color obtained through the decomposition into red, green, and blue into cyan, magenta, yellow, and black corresponding to ink colors.

The correction processing unit performs correction processing on image data for each color obtained through the conversion into cyan, magenta, yellow, and black. Examples of the correction processing include gamma correction processing, density unevenness correction processing, abnormal recording element correction processing, and the like.

The halftone processing unit converts, for example, image data represented by a multi-gradation number such as 0 to 255 into dot data represented by a binary value or a multiple value of a ternary value or more that is less than the number of gradations of the input image data.

A predetermined halftone processing rule is applied to the halftone processing unit. Examples of the halftone processing rule include a dither method, an error diffusion method, and the like. The halftone processing rule may be changed depending on image recording conditions, the content of the image data, and the like.

The printing control unit 212 includes a waveform generation unit, a waveform storage unit, and a drive circuit which are not shown. The waveform generation unit generates the waveform of drive voltage. The waveform storage unit stores the waveform of the drive voltage. The drive circuit generates a drive voltage having a drive waveform corresponding to the dot data. The drive circuit supplies the drive voltage to the ink jet head 10C, the ink jet head 10M, the ink jet head 10Y, and the ink jet head 10K shown in FIG. 9.

That is, jetting timing and an ink jetting amount for each pixel position are determined based on dot data generated through processing performed by using the image processing unit. A drive voltage corresponding to the jetting timing and the ink jetting amount for each pixel position and a control signal for determining jetting timing for each pixel are generated. The drive voltage is supplied to the ink jet head 10 and ink is jetted from the ink jet head 10. The ink jetted from the ink jet head 10 forms dots.

The head movement control unit 214 operates the head moving mechanism 132 in cooperation with the maintenance control unit 216 and the head adjustment control unit 218, in accordance with a command from the system controller 200. The head movement control unit 214 may include a raising and lowering control unit that controls the raising and lowering mechanism and a horizontal movement control unit that controls the horizontal moving mechanism 138.

Note that, the head moving mechanism 132 described in the embodiment corresponds to an example of a movement unit that moves an adjustment unit relative to a head. The head movement control unit 214 corresponds to an example of a movement control unit that moves the adjustment unit.

The maintenance control unit 216 operates the maintenance unit 130 in accordance with a command from the system controller 200. The maintenance control unit 216 may include a wiping control unit that controls the wiping unit 134 and a cap control unit that controls the cap unit 136.

The head adjustment control unit 218 controls the head adjustment unit 150 in accordance with a command from the system controller 200. The head adjustment control unit 218 includes a module information acquisition unit 240, a coordinate setting unit 242, a unit movement control unit 244, and a motor control unit 246.

The module information acquisition unit 240 acquires information for specifying the head module 20 to be adjusted and information for specifying the position of the head module 20 to be adjusted. The module information acquisition unit 240 transmits the acquired information about the head module 20 to be adjusted to the coordinate setting unit 242, the unit movement control unit 244, and the motor control unit 246.

Examples of the information for specifying the head module 20 to be adjusted include a number of each head module 20. The information for specifying the position of the head module 20 to be adjusted includes information on the position about the head module 20 in the direction X which is output from the magnetic sensor 96.

The information for specifying the position of the head module 20 to be adjusted described in the embodiment corresponds to an example of head information including information about the position of the head module in the head. The module information acquisition unit 240 is an example of a head information acquisition unit that acquires head information including information about the position of the head module in the head.

In addition, the module information acquisition unit 240 described in the embodiment corresponds to an example of a detection signal acquisition unit that acquires a detection signal of the position of the head module in the head. The signal output from the magnetic sensor 96 corresponds to an example of a detection signal of the position of the head module in the head.

The coordinate setting unit 242 uses information about the head module 20, which is transmitted from the module information acquisition unit 240, and output signals of the laser sensors 174 so as to set coordinates to be applied to movement control of the head adjusting unit 151, which is performed in the case of adjustment of the head module 20 to be adjusted.

The laser sensor 174 shown in FIG. 11 is any one of the first laser sensor 174A or the second laser sensor 174B shown in FIG. 10. The first laser sensor 174A and the second laser sensor 174B shown in FIG. 10 and the laser sensor shown in FIG. 11 correspond to an example of a detection unit that detects a reference position of the head.

The unit movement control unit 244 controls the operation of a unit moving mechanism 248 by applying the information about the head module 20 to be adjusted which is transmitted from the module information acquisition unit 240 and the coordinates set by means of the coordinate setting unit 242. The unit moving mechanism 248 shown in FIG. 11 includes an X-moving mechanism, a Y-moving mechanism, and a Z-moving mechanism.

The unit movement control unit 244 described in the embodiment corresponds to an example of a movement control unit that moves the adjustment unit. The unit moving mechanism 248 corresponds to an example of a movement unit that moves the adjustment unit relative to the head.

The motor control unit 246 applies the information about the head module 20, which is transmitted from the module information acquisition unit 240, to control the operation of the first motor that rotates the first screw driver portion 160 shown in FIG. 10 and the second motor that rotates the second screw driver portion 162. The motor control unit 246 described in the embodiment corresponds to an example of an actuator control unit.

The ink jet printing apparatus 100 includes an operation unit 230. The operation unit 230 includes an operation member such as an operation button, a keyboard, and a touch panel. The operation unit 230 may include a plurality of types of operation members. The operation member is not shown.

Information input via the operation unit 230 is sent to the system controller 200. The system controller 200 executes various processes in accordance with the information sent from the operation unit 230.

The ink jet printing apparatus 100 includes a display unit 232. The display unit 232 includes a display device such as a liquid crystal panel and a display driver. The display device and the display driver are not shown. The display unit 232 causes the display device to display various information such as various setting information and abnormality information of the apparatus in accordance with a command from the system controller 200.

The ink jet printing apparatus 100 includes a parameter storage unit 234. The parameter storage unit 234 stores various parameters used in the ink jet printing apparatus 100. The various parameters stored in the parameter storage unit 234 are read via the system controller 200 and set for each part of the apparatus.

The ink jet printing apparatus 100 includes a program storage unit 236. The program storage unit 236 stores programs used for each part of the ink jet printing apparatus 100. The various programs stored in the program storage unit 236 are read via the system controller 200 and executed in each part of the apparatus.

Each control unit such as the system controller 200 and the transportation control unit 210 shown in FIG. 11 executes a prescribed program by using hardware described below to realize the functions of the ink jet printing apparatus 100. Various processors can be applied to the hardware of each control unit. Examples of the processors include a central processing unit (CPU) and a graphics processing unit (GPU). The CPU is a general-purpose processor that executes a program to function as various processing units. The GPU is a processor specialized in image processing. As the hardware of the processors, an electric circuit in which electric circuit elements such as semiconductor elements are combined with each other is applied. Each control unit includes a ROM in which a program or the like is stored and a RAM which is a work area for various operations.

Two or more processors may be applied with respect to one control unit. The two or more processors may be the same types of processors or different types of processors. In addition, one processor may be applied with respect to a plurality of control units.

Specific Example of Automatic Position Adjustment of Head Module

Next, automatic position adjustment of the head module 20 in the ink jet printing apparatus 100 described with reference to FIGS. 7 to 11 will be described. Automatic adjustment of the head module 20 is performed in the case of installation of the ink jet printing apparatus 100, in a case where replacement of the head module 20 is performed, in a case where a decrease in performance of the ink jet head 10 attributable to the position of the head module 20 is detected, or the like.

The automatic position adjustment of the head module 20 in the direction X includes an ink jet head moving step, a coordinate setting step, a rotation axis position specifying step, a screw driver rotation amount setting step, and a screw driver rotation step.

Ink Jet Head Moving Step

Figure 12:
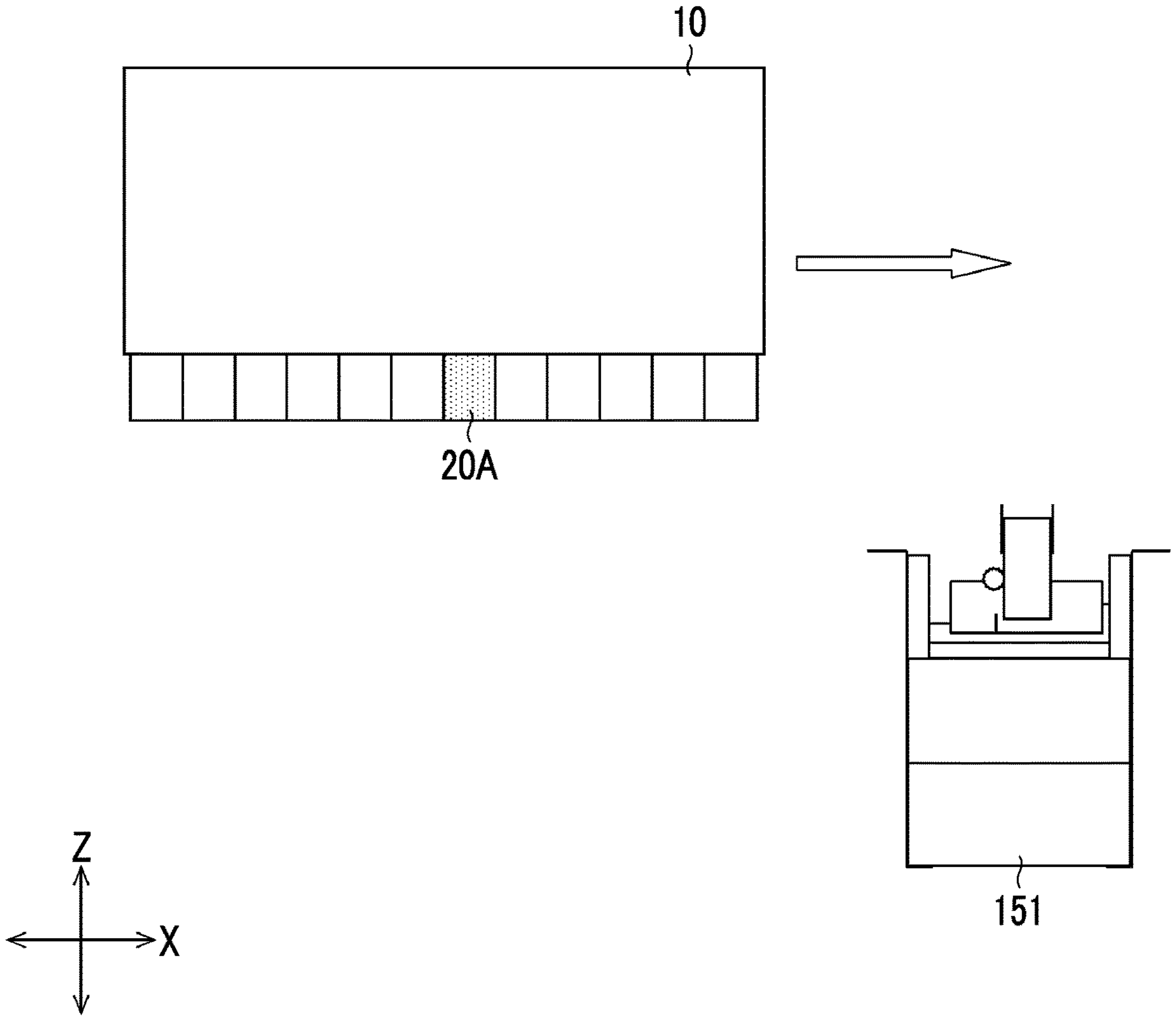
FIG. 12 is an explanatory view of an ink jet head moving step.

FIG. 12 is an explanatory view of the ink jet head moving step. In the ink jet head moving step, the head movement control unit 214 shown in FIG. 10 moves the ink jet head 10 along the direction X.

Figure 13:
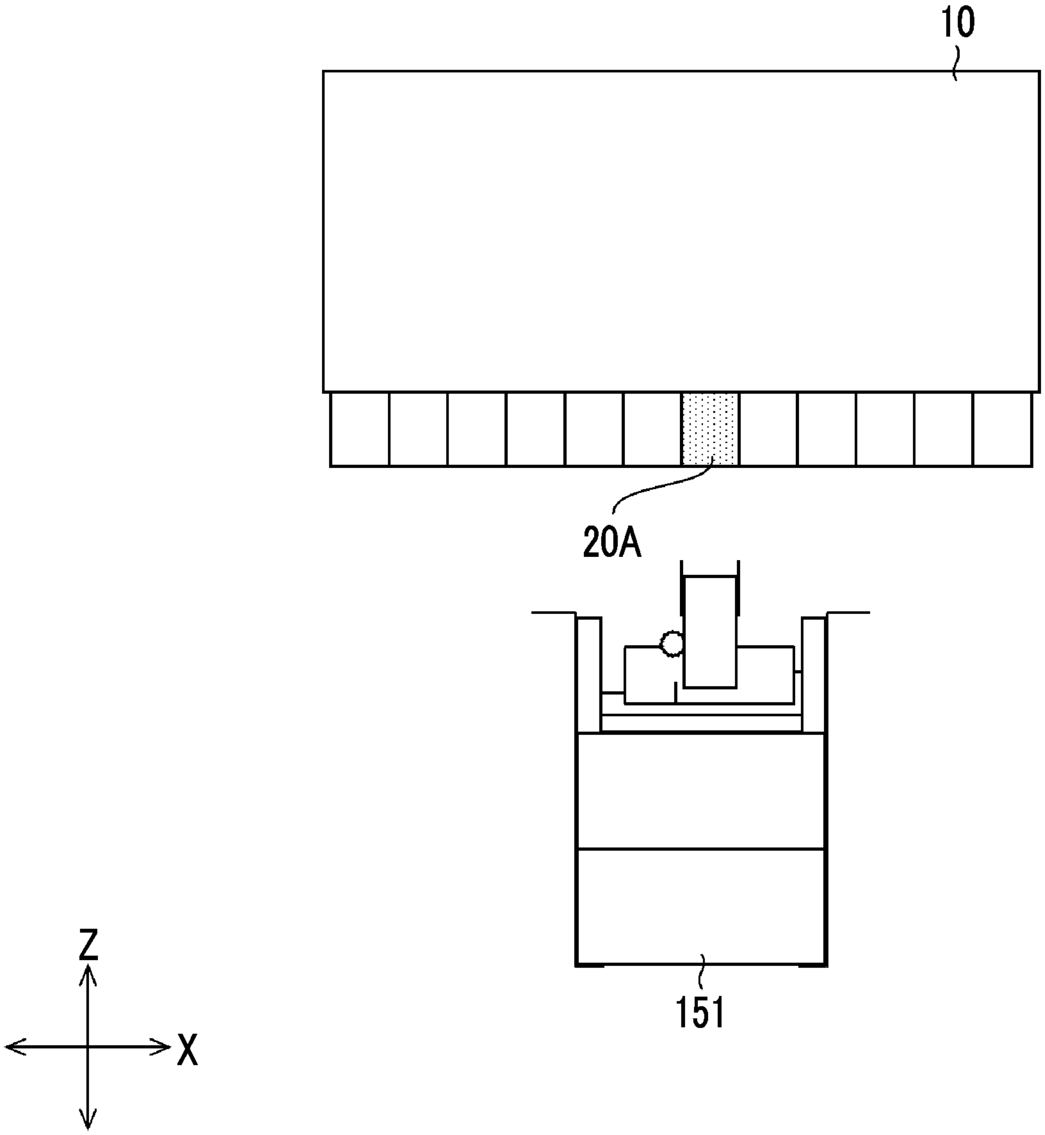
FIG. 13 is an explanatory view of a head stoppage position.

FIG. 13 is an explanatory view of a head stoppage position. In the ink jet head moving step, the head movement control unit 214 stops the ink jet head 10 in a case where the head module 20 to be adjusted reaches the initial position of the head adjusting unit 151. Note that, a head module 20A hatched with dots in FIGS. 12 and 13 is the target to be adjusted. After the ink jet head moving step, the process proceeds to the coordinate setting step.

Coordinate Setting Step

Figure 14:
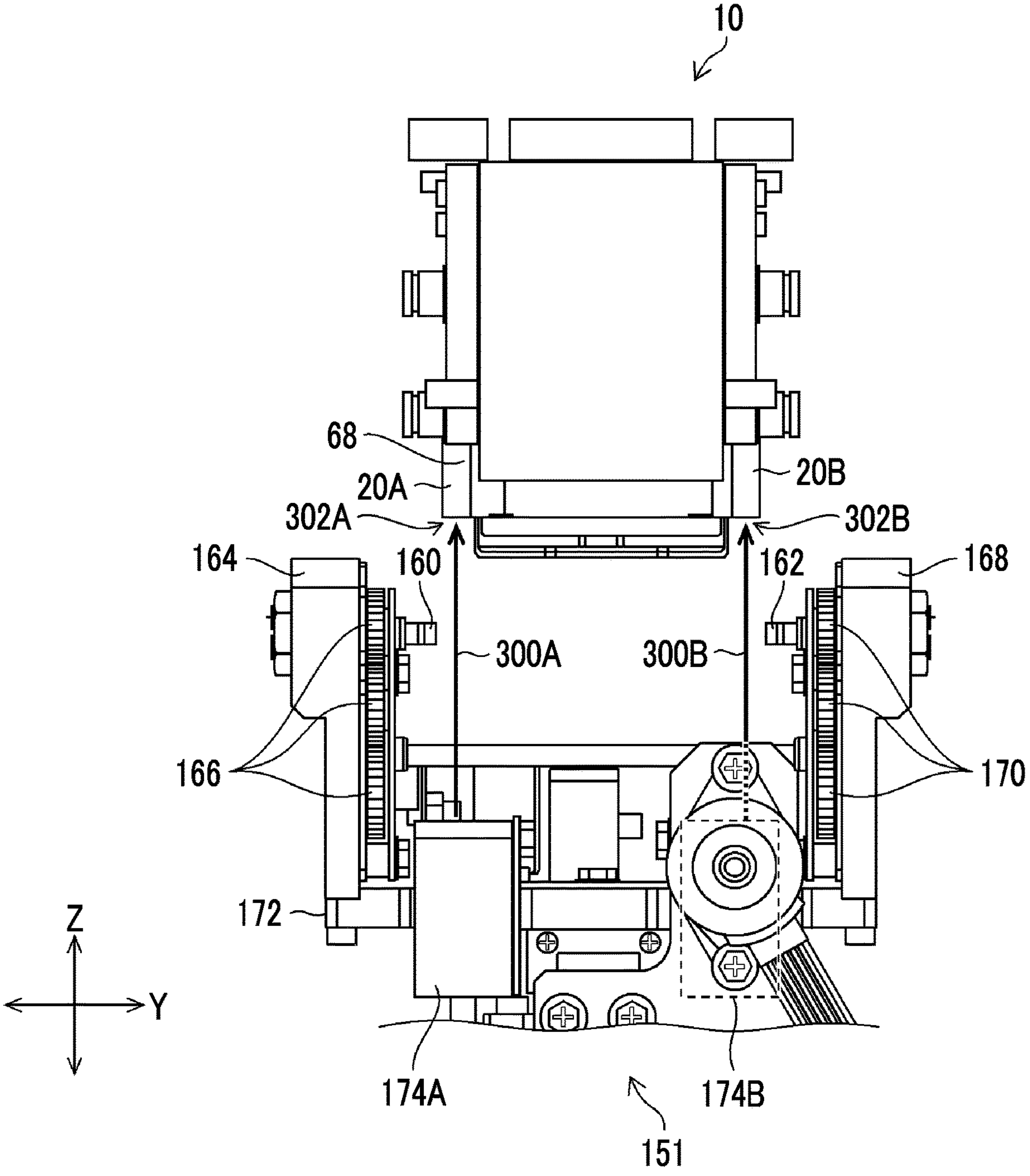
FIG. 14 is a schematic view of reference position detection in the direction Z.

FIG. 14 is a schematic view of reference position detection in the direction Z. In the coordinate setting step, the coordinate setting unit 242 shown in FIG. 11 sets a coordinate system to be applied in the case of recognition of the position of the rotation axis 81 of the cam mechanism 80 provided in the head module 20A to be adjusted. In other words, the coordinate setting unit 242 sets reference positions in the direction X, the direction Y, and the direction Z.

First, the first laser sensor 174A performs irradiation with a laser beam 300A. In this state, the unit movement control unit 244 moves the head adjusting unit 151 in the direction Z. As an irradiation position 302A of the laser beam 300A, any surface of the head module 20A to be measured may be applied. In an example shown in FIG. 14, a lower surface of the Y-reference member 68 is applied as the irradiation position 302A of the laser beam 300A.

The first laser sensor 174A receives reflected light of the laser beam 300A. In a case where the distance between the head module 20A to be measured and the head adjusting unit 151, which is measured by means of the first laser sensor 174A, reaches a prescribed distance, the unit movement control unit 244 stops the head adjusting unit 151. A position at which the head adjusting unit 151 is stopped is the reference position in the direction Z. The coordinate setting unit 242 determines the coordinate value of the rotation axis 81 of the cam mechanism 80 with respect to the reference position in the direction Z.

Note that, in a case where automatic adjustment of a head module 20B is to be performed, the coordinate in the direction Z of the rotation axis 81 of the cam mechanism 80 provided in the head module 20B is set by means of the second laser sensor 174B. A reference numeral 300B represents a laser beam from the second laser sensor 174B with which an irradiation position 302B is irradiated.

Figure 15:
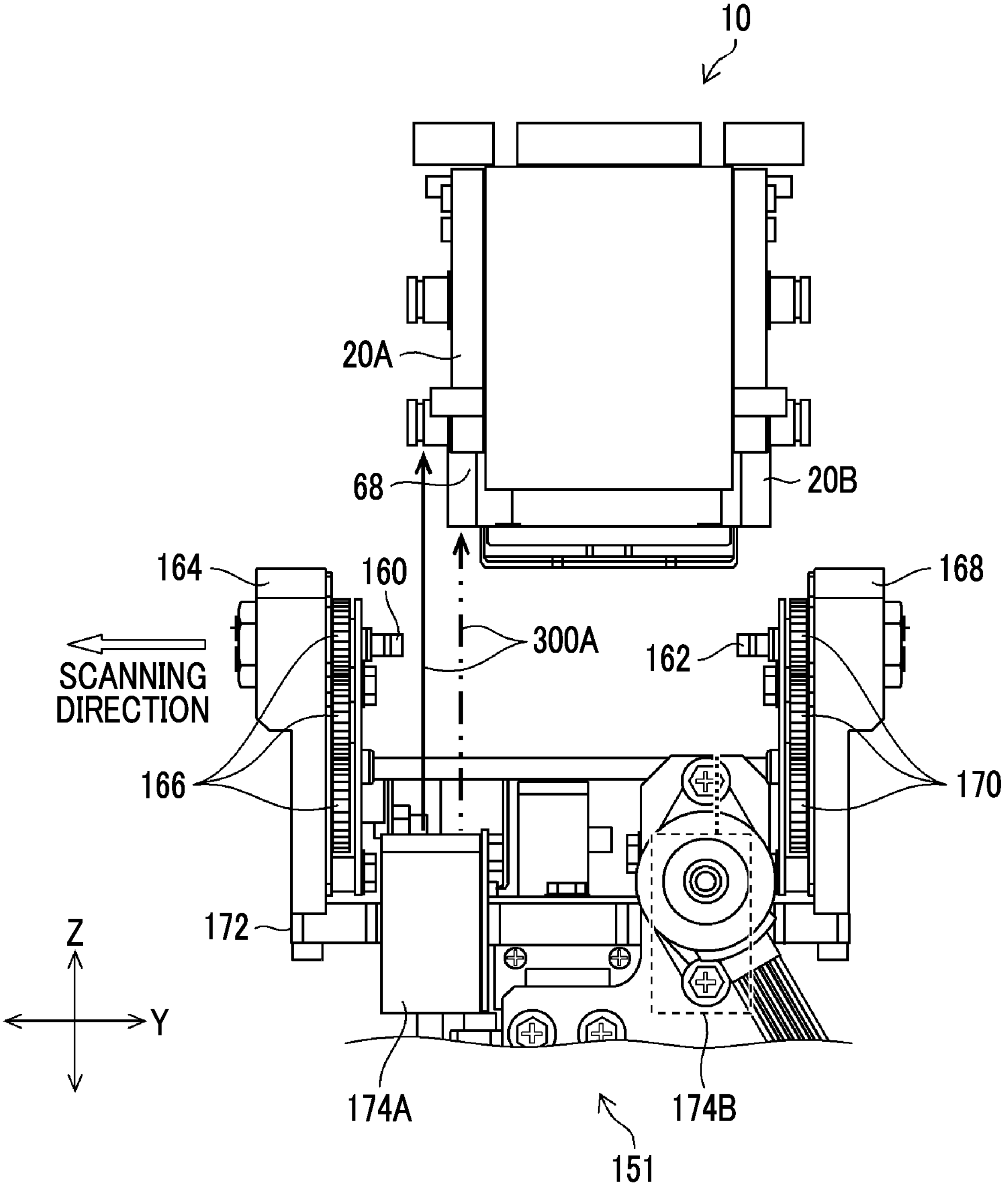
FIG. 15 is a schematic view of reference position detection in the direction Y.

Next, the reference position in the direction Y is specified. FIG. 15 is a schematic view of reference position detection in the direction Y. The head adjusting unit 151 is moved along the direction Y to perform scanning with the laser beam 300A in the direction Y and recognize a prescribed step of the head module 20A. In FIG. 15, the edge of the lower surface of the Y-reference member 68 is shown as the step.

Since the cam mechanism 80 is incorporated into the head module 20, the distance between the position of the step of the head module 20A recognized by the coordinate setting unit 242 and the position of the rotation axis 81 of the cam mechanism 80 has a fixed value. This fixed value can be specified based on design information of the head module 20A and the coordinate setting unit 242 determines the Y-coordinate value of the rotation axis 81 of the cam mechanism 80 with respect to the reference position in the direction Y.

Figure 16:
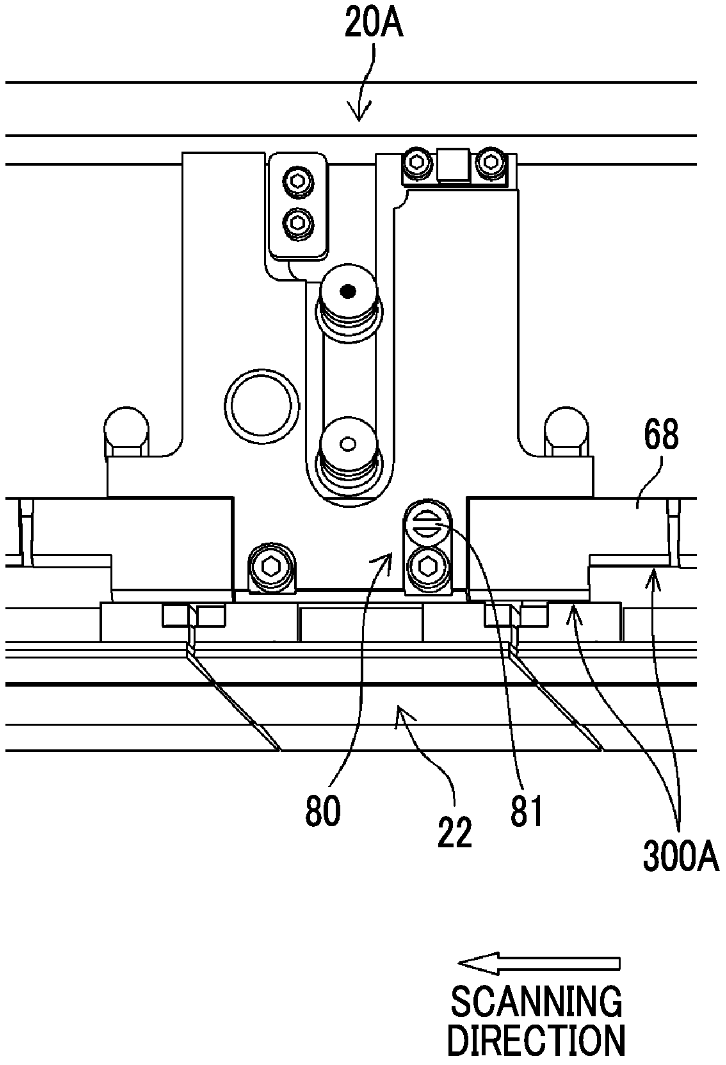
FIG. 16 is a schematic view of reference position detection in the direction X.

Next, the reference position in the direction X is specified. FIG. 16 is a schematic view of reference position detection in the direction X. FIG. 16 is a view showing the head module 20A to be adjusted as seen in the direction Y. The head adjusting unit 151 is moved along the direction X to perform scanning with the laser beam 300A in the direction X and recognize a prescribed step of the head module 20A. Note that, a direction in which the head adjusting unit 151 is moved corresponds to an example of one direction in which the detection unit is moved.

In FIG. 16, a step of the Y-reference member 68 is shown as the step. Similar to the Y-coordinate value of the rotation axis 81 of the cam mechanism 80, the coordinate setting unit 242 determines the X-coordinate value of the rotation axis 81 of the cam mechanism 80 with respect to the reference position in the direction X. After the coordinate setting step, the process proceeds to the rotation axis position specifying step.

Although any surfaces of the head module 20 are applied as the reference position in the direction X, the reference position in the direction Y, and the reference position in the direction Z in the present embodiment, any surfaces of the ink jet head 10 may also be applied.

Rotation Axis Position Specifying Step

In the rotation axis position specifying step, the unit movement control unit 244 specifies the position of the rotation axis 81 of the shaft portion 86 by applying a three-dimensional rectangular coordinate system set by means of the coordinate setting unit 242. That is, the unit movement control unit 244 derives the coordinate values of the rotation axis 81 of the shaft portion 86.

The unit movement control unit 244 moves the head adjusting unit 151 by using the unit moving mechanism 248 to positionally align the axis of the first screw driver portion 160 and the rotation axis 81 of the shaft portion 86 with each other. After the rotation axis position specifying step, the process proceeds to the screw driver rotation amount setting step.

Screw Driver Rotation Amount Setting Step

In the screw driver rotation amount setting step, the motor control unit 246 sets the amount of rotation of the first screw driver portion 160 based on an output signal of the magnetic sensor 96. The motor control unit 246 applies the resolution of the motor 146 such that the resolution of the first screw driver portion 160 becomes less than the resolution of the magnetic sensor 96. After the screw driver rotation amount setting step, the process proceeds to the screw driver rotation step.

Screw Driver Rotation Step

Figure 17:
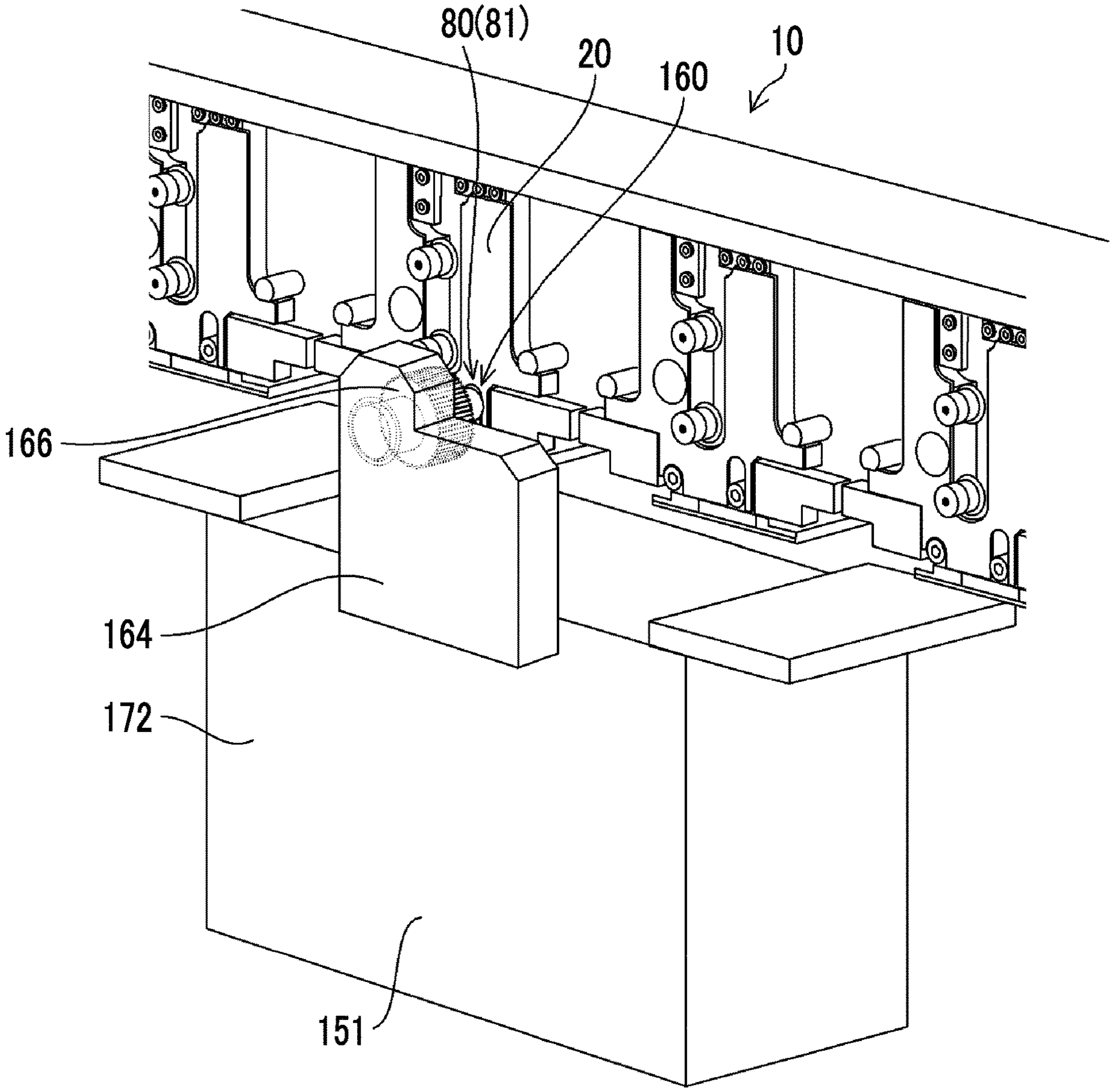
FIG. 17 is a schematic view of a screw driver rotation step.

FIG. 17 is a schematic view of the screw driver rotation step. FIG. 17 shows a state in which the first screw driver portion 160 of the head adjusting unit 151 is fitted into the groove portion 90 of the cam mechanism 80.

In a case where the first screw driver portion 160 is to be fitted into the groove portion 90 of the cam mechanism 80, the phase of the first screw driver portion 160 and the position of the groove portion 90 need to be aligned with each other. In a case where the phase of the first screw driver portion 160 and the position of the groove portion 90 are not aligned with each other, the first screw driver portion 160 may interfere with the shaft portion 86 and the head module 20 may be damaged. Therefore, a supporting structure for the first screw driver portion 160 as in the following description is applied to solve the above-described problem.

Figure 18:
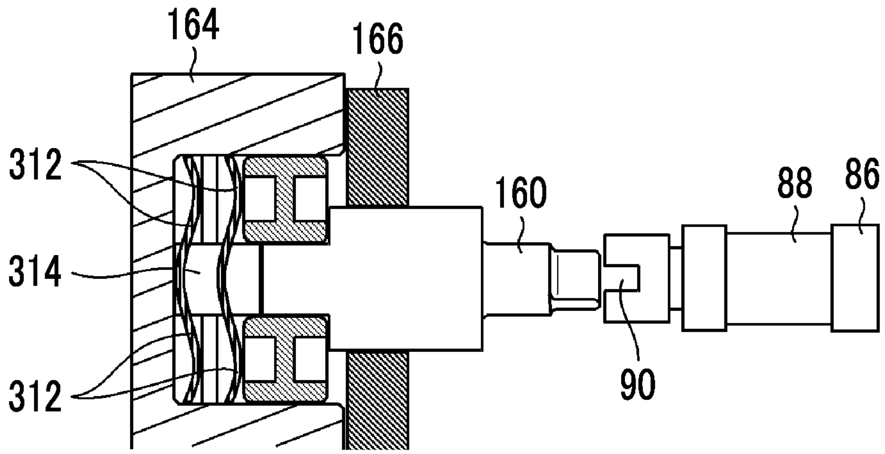
FIG. 18 is a schematic view of a supporting structure for a screw driver portion.

FIG. 18 is a schematic view of a supporting structure for a screw driver portion. The first screw driver portion 160 is supported to be slidable along a thrust direction. A pressure is applied to the first screw driver portion 160 by means of springs 312 and in a state where no load is applied, the first screw driver portion 160 protrudes in the thrust direction from the first driver supporting portion 164. As the springs 312, leaf springs such as wave washers may be applied. The springs 312 described in the embodiment correspond to an example of an elastic deformation member.

In a case where interference occurs due to the phase shift between the first screw driver portion 160 and the groove portion 90, the springs 312 are compressed and the first screw driver portion 160 retracts into the first driver supporting portion 164. Accordingly, a base end of the first screw driver portion 160 comes into contact with a switch 314. It is possible to confirm that the first screw driver portion 160 and the groove portion 90 are not coupled to each other by detecting the contact between the first screw driver portion 160 and the switch 314.

A slide direction of the first screw driver portion 160 described in the embodiment corresponds to an example of a relative movement direction of the actuator and the adjustment member. The switch 314 corresponds to an example of a connection detection unit that detects connection between the actuator and the adjustment member.

The first screw driver portion 160 is rotated in a state where the first screw driver portion 160 is not coupled to the groove portion 90. Only the first screw driver portion 160 is rotated with the first screw driver portion 160 rubbing against the shaft portion 86.

Figure 19:
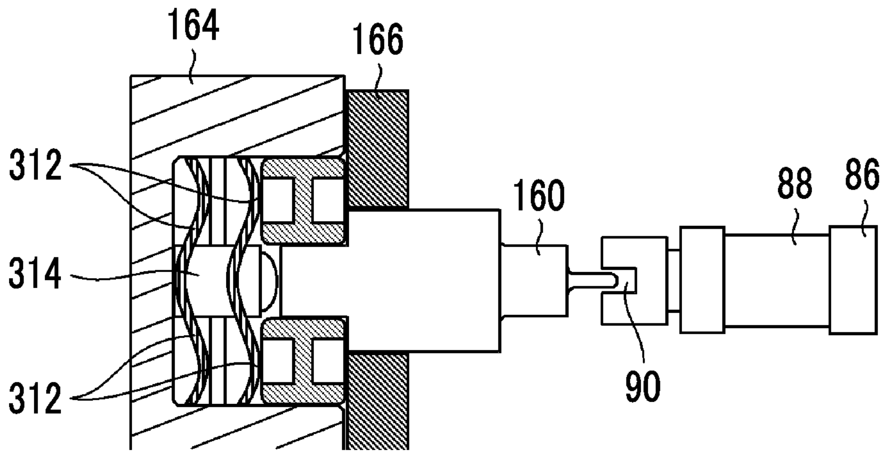
FIG. 19 is an explanatory view of a state in which a screw driver is fitted into a shaft portion.

FIG. 19 is an explanatory view of a state in which the screw driver is fitted into the shaft portion. As shown in FIG. 19, in a case where the first screw driver portion 160 is fitted into the groove portion 90, interference between the first screw driver portion 160 and the shaft portion 86 disappears and the springs 312 are decompressed so that the first screw driver portion 160 protrudes in the thrust direction.

A state where the first screw driver portion 160 is fitted into the groove portion 90 can be detected by means of the switch 314. In this manner, the coupling of the first screw driver portion 160 and the cam mechanism 80 can be realized without applying a load equal to or larger than a certain level of load to the head module 20.

In the screw driver rotation step, the motor control unit 246 rotates a motor 250 in accordance with an output signal of the magnetic sensor 96 to perform adjustment of the head module 20A to be adjusted in a case where it is detected that the first screw driver portion 160 and the cam mechanism 80 are coupled with each other.

In the screw driver rotation step, the head adjustment control unit 218 terminates an adjustment method of the head module 20A to be adjusted in a case where it is recognized that the adjustment of the head module 20A to be adjusted is finished.

Effect

According to the ink jet printing apparatus 100 shown in the present embodiment, the following effects can be achieved.

[1]

The head adjustment unit 150 that adjusts each of the head modules 20 of the ink jet head 10 including the plurality of head modules 20 is provided. The head adjustment unit 150 includes the first screw driver portion 160 that can be fitted into the groove portion 90 of the shaft portion 86 of the cam mechanism 80. The head adjustment unit 150 sets coordinates to be applied to movement of the head adjustment unit 150 based on the reference position of the head module 20 and the head adjustment unit 150 is moved based on the coordinate values of the shaft portion 86 of the cam mechanism 80.

Accordingly, positional alignment of the head adjustment unit 150 and the shaft portion 86 of the cam mechanism 80 is performed and thus the position of the head module 20 can be adjusted based on an operation on the shaft portion 86 of the cam mechanism 80 which is performed by operating the first screw driver portion 160.

[2]

The laser sensors 174 provided in the head adjustment unit 150 are used to detect the reference position of the head module 20. Accordingly, the head adjustment unit 150 can specify the reference position of the head module 20.

[3]

The laser sensors 174 detect the steps of the head module 20. Accordingly, the reference position of the head module can be specified with high accuracy.

[4]

The springs 312 are provided on the base end side of the first screw driver portion 160 to apply a pressure to the first screw driver portion 160. In a case where the first screw driver portion 160 and the shaft portion 86 come into contact with each other, the first screw driver portion 160 is slid toward the base end side in accordance with elastic deformation of the springs 312. Accordingly, no excessive load is applied to the head module 20 and damage to the head module 20 can be prevented.

[5]

The switch 314 for detection of the first screw driver portion 160 fitted into the groove portion 90 is provided. The first screw driver portion 160 is rotated in a case where it is detected that the first screw driver portion 160 is fitted into the groove portion 90. Accordingly, damage to the groove portion 90 can be prevented.

[6]

The amount of rotation of the first screw driver portion 160 is set based on an output signal of the magnetic sensor 96. Accordingly, automatic position adjustment of the head module 20 can be performed based on the actual position of the head module 20.

[7]

The module information acquisition unit 240 acquires information about the position of the head module 20 in the ink jet head 10. Accordingly, the position of the head module 20 can be specified by means of the design information of the ink jet head 10.

[8]

The position of the head module 20 is adjusted by means of the cam mechanism 80 provided in the head module 20. Automatic position adjustment of the head module 20 can be performed even in a case where the rotation axis 81 of the shaft portion 86 of the cam mechanism 80 is moved in accordance with movement of the head module 20.

In the present embodiment, automatic position adjustment of the head module 20 in the direction X has been described as an example. However, application to automatic position adjustment in the direction Y and the direction Z is also possible. Application to an embodiment in which the ink jet head 10 includes the cam mechanism 80 for adjustment of the position of the head module 20 is also possible.

In the present embodiment, the ink jet head 10 in which the plurality of head modules 20 are arranged in a row in the direction X has been described as an example. However, for arrangement of the plurality of head modules 20, zigzag arrangement in two rows and two-dimensional arrangement in three or more rows can also be applied.

Example of Application to Head Adjustment Device and Head Device

The head adjusting unit 151 and the head adjustment control unit 218 in the present embodiment can be configured as a head adjustment device independent of the ink jet printing apparatus 100. In addition, a configuration in which the ink jet head 10 and the head adjusting unit 151 are combined with each other can be configured as a head device. The ink jet head 10 described in the embodiment corresponds to an example of a head. The head adjusting unit 151 corresponds to an example of an adjustment unit including an actuator.

Example of Application to Other Devices

In the present embodiment, a head adjustment device provided in an ink jet printing apparatus has been described as an example. However, the head adjustment device in the present embodiment can also be applied to an electrophotographic printing apparatus which includes an electrophotographic head.

Regarding the embodiment of the present invention described above, the configuration requirements can be appropriately changed, added, or deleted without departing from the spirit of the present invention. The present invention is not limited to the embodiments described above, and various modifications can be made by a person having ordinary knowledge in the art within the technical idea of the present invention.

EXPLANATION OF REFERENCES

10: ink jet head
10C: ink jet head
10M: ink jet head
10Y: ink jet head
10K: ink jet head
20: head module
20A: head module to be adjusted
20B: head module
22: nozzle surface
30: frame
40: flexible substrate
50: base frame
60: body part
62: bracket portion
64: horizontal portion
66: vertical portion
68: Y-reference member
70: Z-reference member
72: Y-fixed contact point member
74: Y-movable contact point member
76: Z-fixed setting member
80: cam mechanism
81: rotation axis
82: plunger
84: leaf spring
86: shaft portion
88: cam portion
90: groove portion
92: positioning pin
93: guide groove

94: guide post
95: magnet
96: magnetic sensor
100: ink jet printing apparatus
110: paper transportation unit
112: printing drum
112A: rotary shaft
130: maintenance unit
132: head moving mechanism
134: wiping unit
134C: wiping device
134M: wiping device
134Y: wiping device
134K: wiping device
136: cap unit
136C: cap
136M: cap
136Y: cap
136K: cap
138: horizontal moving mechanism
140: guide rail
142: ball screw
144: nut
146: motor
148: head supporting frame
150: head adjustment unit
151: head adjusting unit
151C: head adjusting unit
151M: head adjusting unit
151Y: head adjusting unit
151K: head adjusting unit
160: first screw driver portion
162: second screw driver portion
164: first driver supporting portion
166: gear
168: second driver supporting portion
170: gear
172: case
174: laser sensor
174A: first laser sensor
174B: second laser sensor
200: system controller
202: communication unit
203: host computer
204: image memory
210: transportation control unit
212: printing control unit
214: head movement control unit
216: maintenance control unit
218: head adjustment control unit
230: operation unit
232: display unit
234: parameter storage unit
236: program storage unit
240: module information acquisition unit
242: coordinate setting unit
244: unit movement control unit
246: motor control unit
248: unit moving mechanism
250: motor
300A: laser beam
300B: laser beam
302A: irradiation position
302B: irradiation position
312: spring
314: switch

What is claimed is:

1. A head adjustment device which adjusts a position of a head module in a head including one or more head modules, the head adjustment device comprising:

an adjustment unit that includes an actuator that is connected to an adjustment member, which is operated in a case where the position of the head module is to be adjusted, and operates the adjustment member;

a movement unit that, in a case where the adjustment unit is not aligned with the head module, moves the adjustment unit relative to the head so as to align the adjustment unit to the head module; and a movement control unit that sets coordinates to be applied to the movement unit based on a reference position of the head and moves the adjustment unit based on coordinate values of the adjustment member.

2. The head adjustment device according to claim 1, further comprising:

a detection unit that detects the reference position of the head.

3. The head adjustment device according to claim 2, wherein the movement unit moves the detection unit in one direction, and the detection unit detects a step of the head.

4. The head adjustment device according to claim 1, further comprising:

an elastic deformation member that is elastically deformed in a relative movement direction of the actuator and the adjustment member in a case where the actuator and the adjustment member are connected to each other.

5. The head adjustment device according to claim 1, further comprising:

a connection detection unit that detects connection between the actuator and the adjustment member; and an actuator control unit that operates the actuator in a case where the connection between the actuator and the adjustment member is detected by means of the connection detection unit.

6. The head adjustment device according to claim 5, further comprising:

a detection signal acquisition unit that acquires a detection signal of the position of the head module in the head, wherein the actuator control unit operates the actuator based on the detection signal acquired by means of the detection signal acquisition unit.

7. The head adjustment device according to claim 1, further comprising:

a head information acquisition unit that acquires head information including information about the position of the head module in the head, wherein the movement control unit derives coordinate values of the adjustment member based on a reference position of the head module.

8. A head device comprising:

a head that includes one or more head modules; and a head adjustment device that adjusts a position of the head module, wherein the head adjustment device includes an adjustment unit that includes an actuator that is connected to an adjustment member, which is operated in a case where the position of the head module is to be adjusted, and operates the adjustment member, a movement unit that, in a case where the adjustment unit is not aligned with the head module, moves the adjustment unit relative to the head so as to align the adjustment unit to the head module, and a movement control unit that sets coordinates to be applied to the movement unit based on a reference position of the head and moves the adjustment unit based on coordinate values of the adjustment member.

9. The head device according to claim 8, wherein the adjustment member includes an eccentric cam provided in the head module, and the movement control unit applies the position of the head module as the reference position of the head to set the coordinates to be applied to the movement unit based on the reference position of the head module and to move the adjustment unit based on coordinate values of the adjustment member.

10. A printing apparatus comprising:

a head that includes one or more head modules; and a head adjustment device that adjusts a position of the head module, wherein the head adjustment device includes an adjustment unit that includes an actuator that is connected to an adjustment member, which is operated in a case where the position of the head module is to be adjusted, and operates the adjustment member, a movement unit that, in a case where the adjustment unit is not aligned with the head module, moves the adjustment unit relative to the head so as to align the adjustment unit to the head module, and a movement control unit that sets coordinates to be applied to the movement unit based on a reference position of the head and moves the adjustment unit based on coordinate values of the adjustment member.

* * * * *